US009597970B2

(12) United States Patent
DeBoer, III et al.

(10) Patent No.: US 9,597,970 B2
(45) Date of Patent: Mar. 21, 2017

(54) STATUS INDICATING ELECTRIC VEHICLE CHARGING STATION, LIGHTGUIDE ASSEMBLY AND METHODS

(71) Applicant: Siemens Industry, Inc., Alpharetta, GA (US)

(72) Inventors: John R. DeBoer, III, Denver, CO (US); John Quentin Cowans, Decatur, GA (US); Timothy Biedrzycki, Powder Springs, GA (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 14/614,512

(22) Filed: Feb. 5, 2015

(65) Prior Publication Data

US 2015/0145479 A1 May 28, 2015

Related U.S. Application Data

(63) Continuation of application No. 13/482,134, filed on May 29, 2012.

(Continued)

(51) Int. Cl.
*G08B 21/00* (2006.01)
*B60L 11/18* (2006.01)
(Continued)

(52) U.S. Cl.
CPC ....... *B60L 11/1816* (2013.01); *B60L 11/1824* (2013.01); *G08B 21/18* (2013.01);
(Continued)

(58) Field of Classification Search
CPC .. B60L 11/1816; B60L 11/1824; Y02T 90/12; Y02T 10/7005; Y02T 90/14;
(Continued)

(56) References Cited

U.S. PATENT DOCUMENTS 4,635,204 A * 1/1987 Jones ............... G07B 17/00314
705/411
5,515,464 A * 5/1996 Sheem ................. G02B 6/2808
385/131

(Continued)

FOREIGN PATENT DOCUMENTS

CN 101837735 A 9/2010
CN 201584472 U 9/2010

OTHER PUBLICATIONS

Shark 100-S Manual; Electro Industries Gaugetech; Aug. 3, 2009; V1.11; (120 pages).

*Primary Examiner* — Hai Phan
*Assistant Examiner* — Zhen Y Wu

(57) ABSTRACT

An electric vehicle charging apparatus is disclosed. The electric vehicle charging apparatus has a housing having a body, and a light guide assembly adapted to display a status of the electric vehicle charging apparatus as a halo. The light guide assembly generates and displays one or more colors, flashing lights, or combinations thereof on a light exit region having a tilted side facing surface. In another aspect, a hinged lid configuration of the electric vehicle charging apparatus is provided having a mechanical control panel including lighted status indicators on the lid. Methods of operating the electric vehicle charging apparatus are provided, as are other aspects.

19 Claims, 24 Drawing Sheets

Related U.S. Application Data

(60) Provisional application No. 61/509,156, filed on Jul. 19, 2011.

(51) Int. Cl.
  *H02J 7/00* (2006.01)
  *G08B 21/18* (2006.01)

(52) U.S. Cl.
  CPC ............. *H02J 7/00* (2013.01); *Y02T 10/7005* (2013.01); *Y02T 10/7072* (2013.01); *Y02T 90/12* (2013.01); *Y02T 90/121* (2013.01); *Y02T 90/14* (2013.01)

(58) Field of Classification Search
  CPC ...... Y02T 90/121; Y02T 10/7072; H02J 7/00; G08B 21/18
  USPC ......................................................... 340/635
  See application file for complete search history.

(56) References Cited

U.S. PATENT DOCUMENTS

| | | | | |
|---|---|---|---|---|
| 5,801,345 A | * | 9/1998 | Mikula-Curtis | H01H 13/702 200/314 |
| 5,902,148 A | * | 5/1999 | O'Rourke | H01R 25/003 439/505 |
| 5,932,939 A | * | 8/1999 | Simmons | H02B 1/50 307/326 |
| 6,026,682 A | * | 2/2000 | McCormick | B23K 9/323 73/196 |
| 6,592,245 B1 | * | 7/2003 | Tribelsky | B64F 1/007 362/259 |
| 6,637,924 B2 | * | 10/2003 | Pelka | F21S 48/2237 362/327 |
| 6,798,191 B1 | * | 9/2004 | Macfarlane | G01R 22/065 324/156 |
| 2002/0009275 A1 | * | 1/2002 | Williams | G02B 6/0008 385/123 |
| 2004/0071435 A1 | * | 4/2004 | Okada | G02B 6/10 385/146 |
| 2005/0171408 A1 | * | 8/2005 | Parker | A61B 17/02 600/249 |
| 2005/0265659 A1 | * | 12/2005 | Miller | G02B 6/305 385/43 |
| 2007/0159037 A1 | * | 7/2007 | Hoffman | E05D 15/58 312/322 |
| 2008/0062711 A1 | * | 3/2008 | Veenstra | B29C 45/14639 362/546 |
| 2008/0286995 A1 | * | 11/2008 | Greenberg | H01R 25/006 439/92 |
| 2010/0024466 A1 | * | 2/2010 | Kwon | F25D 11/02 62/449 |
| 2010/0246198 A1 | * | 9/2010 | Hook | B60L 11/1818 362/459 |
| 2010/0328625 A1 | * | 12/2010 | Miyazaki | G02B 26/008 353/85 |
| 2011/0029144 A1 | * | 2/2011 | Muller | B60L 11/1816 700/293 |
| 2011/0033154 A1 | * | 2/2011 | Weynant | G02B 6/3802 385/62 |
| 2011/0103091 A1 | * | 5/2011 | Kunimochi | G02B 6/0046 362/611 |
| 2011/0292660 A1 | * | 12/2011 | Eichelberger | G02B 6/0006 362/311.02 |
| 2012/0092888 A1 | * | 4/2012 | Hsieh | G02B 6/0028 362/606 |
| 2012/0195052 A1 | * | 8/2012 | Puskar-Pasewicz | H02G 3/14 362/341 |

* cited by examiner

STATUS INDICATING ELECTRIC VEHICLE CHARGING STATION, LIGHTGUIDE ASSEMBLY AND METHODS

RELATED APPLICATIONS

This application is a continuation of, and claims priority to, U.S. patent application Ser. No. 13/482,134 filed on May 29, 2012, entitled "STATUS INDICATING ELECTRIC VEHICLE CHARGING STATION, LIGHTGUIDE ASSEMBLY AND METHODS," which claims priority from U.S. Provisional Patent Application Ser. No. 61/509,156 filed on Jul. 19, 2011, entitled "LIGHTING SYSTEM AND METHOD OF PROTECTING USER IN ELECTRIC VEHICLE INSTALLATIONS," the disclosures of each of which are hereby incorporated by reference in their entirety herein.

FIELD

The present invention relates generally to apparatus, systems and methods adapted to electrically charge electric vehicles, and in particular to electric vehicle charging apparatus and methods.

BACKGROUND

With the advent of high fuel prices, the automotive industry has reacted with a selection of Electric Vehicles (EVs). Such EVs are propelled by an electric motor (or motors) that are powered by rechargeable power sources (e.g., battery packs). EVs include both full electric and hybrid electric vehicles. Electric motors have several advantages over internal combustion engines. For example, electric motors may convert about 75% of the chemical energy from the batteries to power the wheels, whereas internal combustion engines are considerably less efficient. EVs emit no tailpipe pollutants when operating in battery mode. Electric motors provide quiet, smooth operation, strong acceleration and require relatively low maintenance.

However, most current EVs can only go about 100-200 miles before requiring electrical recharging. Fully recharging an EV's battery pack may take about 4 to 8 hours. Even a quick charge to about 80% capacity can take about 30 minutes. Furthermore, as battery pack size increases, so does the corresponding charging time. EV charging may take place at the owner's residence using electric vehicle supply equipment (EVSE), commonly referred to as an electric vehicle charging station.

Such EVSEs may be installed at a residence (e.g., in a garage), such as on an inside or outside wall, post or other structure, and may be electrically coupled to an electrical load center of the residence. Existing EVSEs may take a long time to accomplish vehicle charging, and improved charging performance is sought after. Further, installation of the EVSEs may be difficult in some instances. Moreover, existing EVSE designs tend not to be user friendly.

Therefore, there is a need for simple, cost effective, and high performance EVSEs, as well as improved methods for operating and installing such electric vehicle charging stations.

SUMMARY

According to a first aspect, an electric vehicle charging apparatus is provided. The electric vehicle charging apparatus includes a housing having a periphery and a body, and a light guide assembly mounted to the body and adapted to display a status of the electric vehicle charging apparatus, the light guide assembly further comprising: a light guide including a light receiving region located adjacent to one or more light sources, a light guiding region, and a light exit region at the periphery, wherein the light exit region includes a side facing surface including an angle of tilt relative to light emitted from the light guiding region, the side facing surface configured to provide a halo effect about one or more segments of the periphery.

According to another aspect, an electric vehicle charging apparatus is provided. The electric vehicle charging apparatus includes a housing having a body and a lid including visual indicators, wherein the lid is hinged to the body, a barrier shield mounted under the lid including a plurality of channeling elements, a printed circuit board under the barrier shield including one or more switches, and one or more light sources mounted adjacent to the plurality of channeling elements, and one or more buttons on the lid coupled to one or more posts, which when depressed make physical contact to toggle the one or more switches and display status information on the visual indicators through the plurality of channeling elements.

According to another aspect, an electric vehicle charging apparatus is provided. The electric vehicle charging apparatus includes a housing having a periphery, a body, and a lid, wherein the lid is hinged to the body and includes visual indicators, a light guide assembly mounted to the body and adapted to display a status of the electric vehicle charging apparatus, the light guide assembly further comprising: a barrier shield mounted under the lid and including a plurality of channeling elements, a printed circuit board under the barrier shield and including one or more light sources and one or more switches, a light guide including: a light receiving region located adjacent to the one or more light sources, a light guiding region, and a light exit region at the periphery, wherein the light exit region includes a side facing surface including an angle of tilt relative to light emitted from the light guiding region, the side facing surface configured to provide a halo effect about one or more segments of the periphery, and one or more buttons on the lid coupled to one or more posts, which when depressed make physical contact to toggle the one or more switches and display status information on the visual indicators through the plurality of channeling elements.

Still other aspects, features, and advantages of the present invention may be readily apparent from the following detailed description by illustrating a number of exemplary embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The drawings are not necessarily drawn to scale. The invention covers all modifications, equivalents, and alternatives falling within the scope of the invention.

BRIEF DESCRIPTION OF DRAWINGS

FIG. 10 illustrates a front view of a housing and some internal components and an outside cord option of electrical connection of an electric vehicle charging apparatus according to embodiments.

DETAILED DESCRIPTION

Figure 1A:
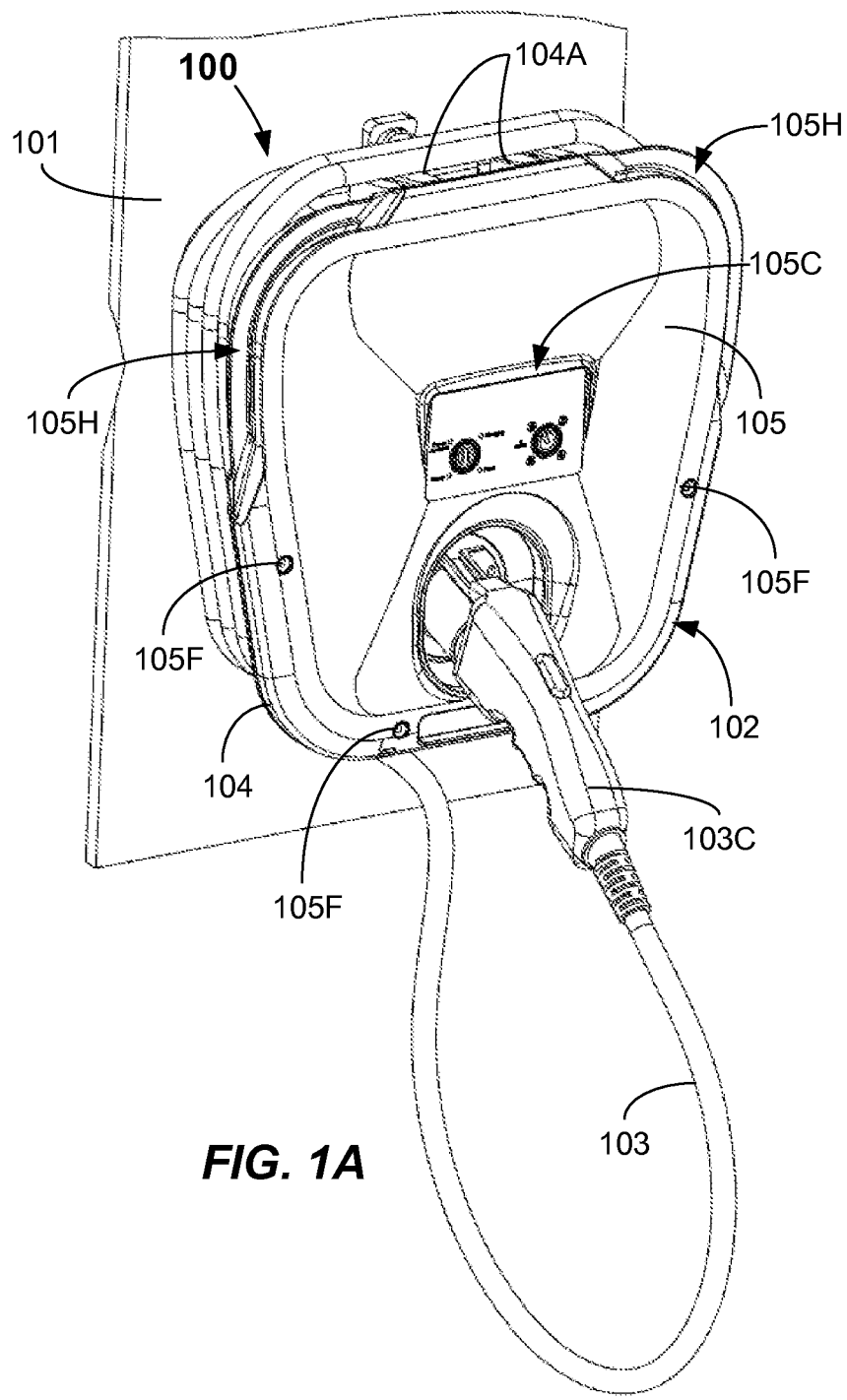
FIG. 1A illustrates a front isometric view of an electric vehicle charging apparatus according to embodiments.
Figure 1B:
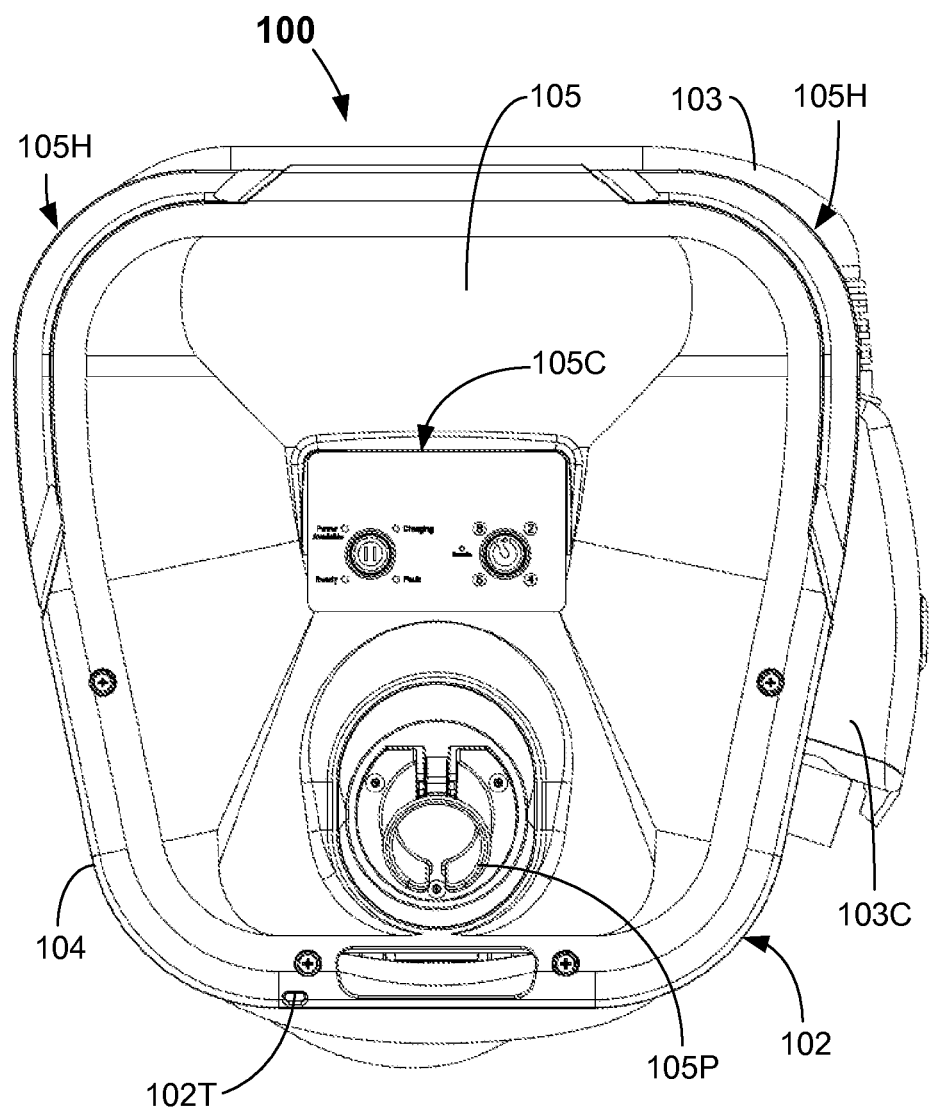
FIG. 1B illustrates a front plan view of an electric vehicle charging apparatus according to embodiments.

Reference will now be made in detail to the example embodiments of which are illustrated in the accompanying drawings. Wherever possible, the same reference numbers will be used throughout the drawings to refer to the same or like parts. The drawings are not necessarily drawn to scale.

Current EVSEs may include very small status indicators or LCD screens to indicate rudimentary operational status such as charging or pause. Generally, such small status indicators or LCD screens are located on a front face of the EVSE unit. In order to assess the status of the EVSE, such as the state of charging, the user may need to approach the EVSE quite closely. In some instances, the unit may be outside, or at a distance from the residence, or even across a garage or other vehicle storage area. As such, the user must approach closely to determine the status of the unit, i.e., to read the LCD screen or other status indicators.

In one or more embodiments of the present invention, enhanced user functionality and user feedback is provided. In particular, in a first aspect according to embodiments of the present invention, an EVSE lighting apparatus is provided wherein a status of the EVSE is readily conveyed to a user, while the user is at a distance from the EVSE. Status of the EVSE may be readily conveyed to the user at distances of 20 meters or more, 30 meters or more, 40 meters or more, or even 50 meters or more. Various colors may be prominently displayed on one or more external regions of the housing of the EVSE and may be used to convey various pieces of status information about the EVSE to the user at a distance. In other embodiments, flashing lights may be used to indicate status information, such as a charging state.

For example, in one or more embodiments, a light guide assembly of the EVSE may generate and display one or more colors and/or flashing lights on a light exit region located on the housing exterior that indicate status to the user. The light exit region may be provided around the periphery of the housing, such as around portions of the lid. Status such as charge completeness, readiness to charge, fault, fault condition/type, charge time delay, pause, indicating remote access, or the like may be provided.

In one or more embodiments, the light guide assembly is secured to a housing body, and in particular, is used to close off access to a high voltage area of the EVSE where high voltage components (e.g., contactor, high voltage wiring, high voltage printed circuit board and connections to SAEJ1772) are provided. Thus, as the lid is hinged open, the light guide assembly positioned under the lid covers the high voltage components such that the user cannot see or touch such components. The only component that is accessible is the one or more connection terminals, and they may also be mounted under a safety cover.

In another aspect, a lid of the EVSE is hinged and may be readily rotated and locked in place in an opened configuration so that the user, installer, or technician may install or service the EVSE. While the lid may include functionality so that it may be hinged and rotated out of place, the lid may still have detailed status information displayed on a surface thereof, and this may be accomplished without actually having any wiring routed to the lid.

Embodiments of the invention will be explained in greater detail with reference to FIGS. 1A-6 below.

FIG. 1A illustrates an embodiment of an electric vehicle charging apparatus 100 being mounted to a structure 101, such as a wall. Optionally, the housing 102 may be mounted to structures such as a stud, post, pedestal, or the like. The electric vehicle charging apparatus 100 receives electrical power from an electrical power supply system or component by electrically connecting to a residential panel box, sub-panel box, electrical gang box, or electrical receptacle (e.g., an electrical outlet) or the like. The electric vehicle charging apparatus 100 is adapted to charge an electric vehicle (EV) 504 (See FIG. 5A).

The electric vehicle charging apparatus 100 includes a housing 102, which may effectively function to compartmentalize the internal components, and provide status information to a user. In one aspect, the status information may be viewed at a distance. Additionally, relatively detailed status information may be displayed on a control panel on the housing.

The housing 102 may have a body 104 having a front and a rear and a lid 105 rotationally mounted and coupled to the front the body 104. The lid 105 may be removable or hinged such that it may be rotated away from the housing to provide access to the internal regions of the electric vehicle charging apparatus 100. In one or more embodiments, as shown in FIGS. 3A-3D, one or more hinges 104A may rotationally mount the lid 105 to the body 104, such as at a top thereof. The lid 105 may include a latch or other securing features, such as one or more screws to fasten the lid 105 to the body 104. A tamper evident connection 102T may be provided on the front of the housing 102, via aligned holes passing through the body 104 and the lid 105. This will allow the utility personnel to add a tamper proof tag through the holes to prevent unauthorized persons from accessing the electric vehicle charging apparatus 100.

Figure 5A:
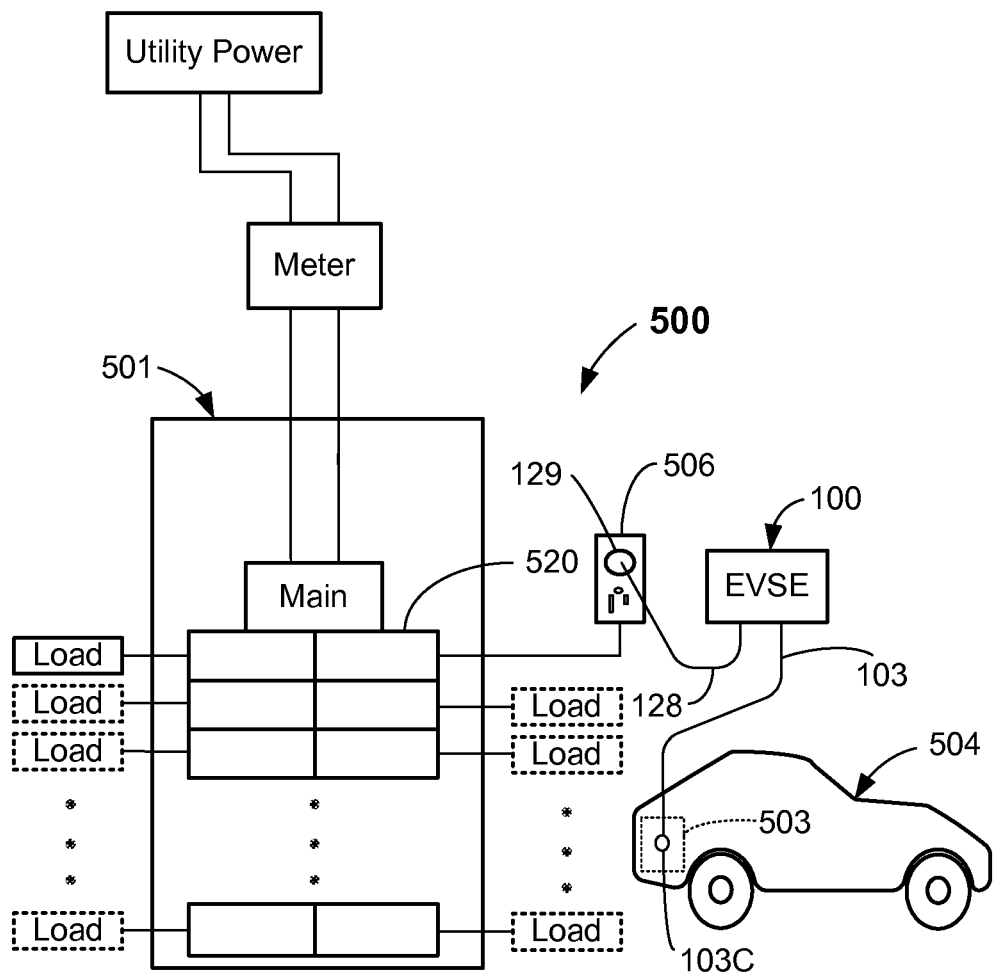
FIG. 5A is an electrical block diagram of an electrical system including an electric vehicle charging apparatus according to embodiments.

The electric vehicle charging apparatus 100 includes a charging cable 103 and an electrical connector 103C that is adapted to couple to a mating connector located on the electric vehicle 504 (FIG. 5A). In the depicted embodiment, the electrical connector 103C may be mounted for easy access on a front mounting post 105P (FIG. 1B) formed on the housing 102, such as on the lid 105. The housing 102 may have a suitable shape such that the charging cable 103 may be wrapped about a periphery of the housing 102 one or more times and may include a housing lip that is adapted to provide a channel in conjunction with the structure 101 to retain the charging cable 103 within bounds, much like a hose reel. The body 104 may be made of a plastic material, such as a flame-retardant plastic material (e.g., a glass-filled, flame-retardant polyester material). However, in one or more embodiments, the lid 105 may be made from a more attractive plastic, such as a less flame retardant plastic (e.g., a non-glass-filled polycarbonate plastic). In this manner, a wider pallet of colors of the plastic may be available, a surface smoothness may be enhanced, and/or injection molding may be improved. Other suitable materials may be used.

The one or more hinges 104A may allow relatively free rotation of the lid 105 relative to the body 104, and may include a suitable mechanism (FIGS. 3A-3F) for locking the lid 105 in an opened position. The lid may be hinged into complete or partially opened configurations. One or more closure fasteners 105F may be used to fasten the lid 105 to the body 104 when hinged closed. A suitable flexible seal may be provided around the periphery or the body 104 or lid 105 and located at the intersection thereof in order to seal the internal portions and cavities of the electric vehicle charging apparatus 100 from water and weather, such that outside use is possible.

The electric vehicle charging apparatus 100 may include a control panel 105C that may be located on the lid 105. The control panel 105C allows the user to select various items, such as pause and delay time via pressing one or more buttons on the control panel 105C. Other functions may be accessed on the control panel 105C. Additionally, small status indicator lights may be displayed on the front of the lid 105 next to indicia (e.g., power available, Ready, Charging, Fault, delay time, or the like). Other indicia may be used. These small status indicator lights provide immediate feedback to the user, when the user is making changes to the settings on the electric vehicle charging apparatus 100.

Additionally or alternatively, the electric vehicle charging apparatus 100 may include a light guide assembly 465 (See FIG. 4B) that is adapted to generate and display one or more colors, one or more flashing lights (e.g., one or more colored lights), or combinations of the aforementioned at one or more light exit regions 105H (e.g., at one or more halos). These light exit regions 105H (e.g., halos) are large enough so that they may be readily and clearly viewed from across a room or from an appreciable distance (say at 20 meters or more, 30 meters or more, 40 meters or more, or even 50 meters or more). The light exit regions 105H may be provided on one side or more than one side of the housing 102. In the depicted embodiment, the light exit regions 105H are provided on opposite sides of the one or more hinges 104A. The light exit regions 105H may be provided in segments about the periphery of the housing 102, as shown. In the depicted embodiment, each of the light exit regions 105H extends from the location of the hinge around the upper corner, and at least part way down the sides of the electric vehicle charging apparatus 100. Other halo configurations may be used.

Various electrical installations of the electric vehicle charging apparatus 100 may used. One configuration is shown in FIG. 5A. As installed, the electric vehicle charging apparatus 100 comprises at least one of the electrical loads that are electrically connected to an electrical supply system 500. The number of loads may be as many as allowed by the load center 501, and/or any sub-panel electrically coupled thereto. Each electrical load may be protected by its own circuit breaker, and such circuit breakers may have amperage ratings of between about 10 A and about 125 A, for example. One of the electrical circuit branches may include an electrical load, which is the electric vehicle charging apparatus 100.

The electric vehicle charging apparatus 100 is adapted to supply an electrical current output to charge an electrical power source 503 (e.g., a battery pack) of an electric vehicle (EV) 504. In the depicted embodiments herein, the charge may be at 220V. Accordingly, a much more rapid charge may be achieved. The power may be supplied to the EV 504 by the charging cable 103 having the electrical connector 103C electrically coupling to a receiving connector on the EV 504. As shown in FIG. 5A, the electric vehicle charging apparatus 100 may be plugged directly into an electrical receptacle 506 that is electrically coupled to the circuit breaker 520. The electric vehicle charging apparatus 100 may include an outside electrical cord 128 and a suitable outside electrical plug 129, such as a 240 V NEMA plug. Other plugs may be used. Thus, in this embodiment, the electric vehicle charging system 100 is wired with an outside cord option and powered through the outside electrical cord 128 and outside electrical plug 129, which provides excellent flexibility regarding installation location of the electric vehicle charging apparatus 100. The term "outside" as used herein denotes a position outside of a footprint of the electric vehicle charging apparatus 100, i.e., external to, but not behind the electric vehicle charging apparatus 100.

Optionally, the electric vehicle charging apparatus 100 may be wired to a rear electrical receptacle via a rear receptacle mount option or to a gang box located behind the electric vehicle charging system 100, i.e., within the footprint of the electric vehicle charging apparatus 100. In yet another embodiment, the electric vehicle charging system 100 may be wired directly to a circuit breaker 520 in a main load center 501, or to a sub-panel (not shown) electrically coupled to the main load center 501, such as through a conduit. To complete this installation, an electrical cable (e.g., 10-3 cable) is run through the conduit and is passed through a first wiring entry 116 (See FIG. 1D). The first wiring entry 116 may be formed by removing a knock out or a replacement plug. In the case of a replacement plug, which may be a sealed plug, the replacement plug can be swapped to another location within the electric vehicle charging apparatus 100 when reconfiguring the electrical connection (e.g., in the field). In all mounting options, the wires of the cord or cables are connected to one or more electrical terminals 107 provided on the inside of a first front cavity 106.

Figure 1C:
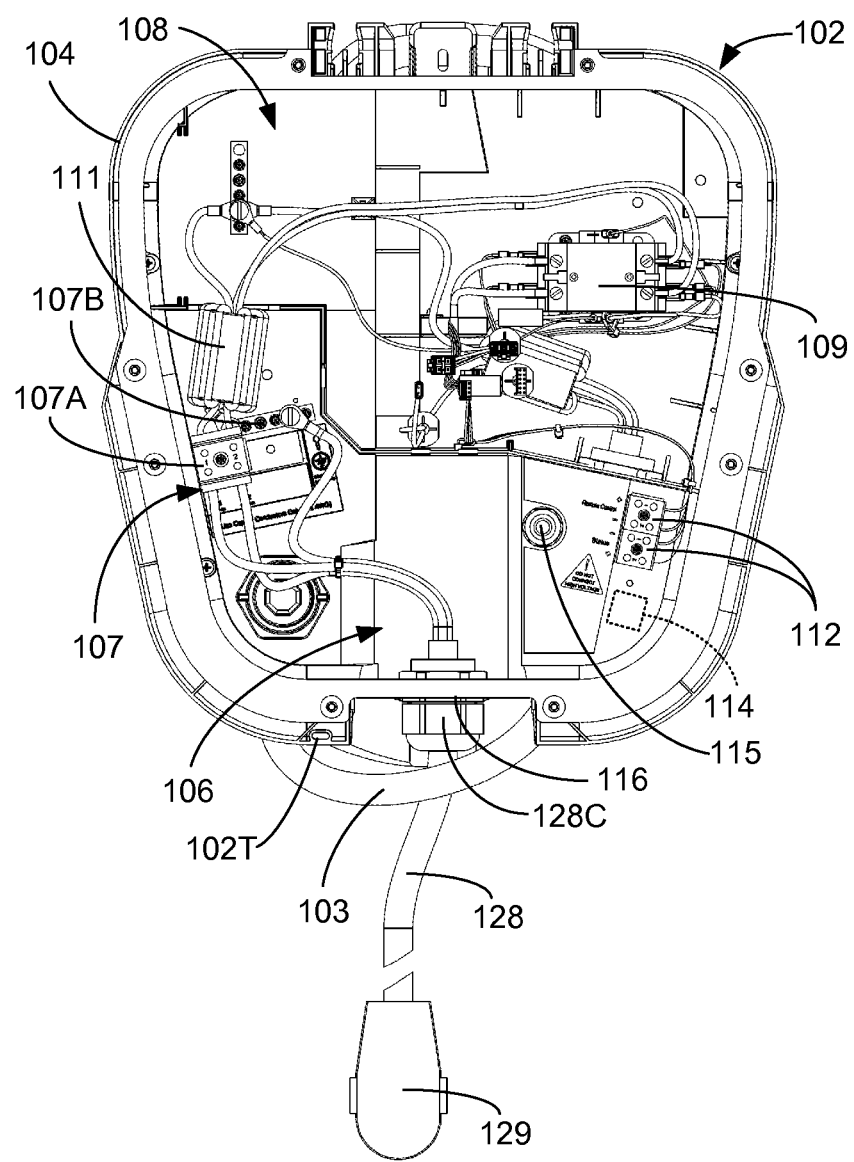
FIG. 1D illustrates an isometric front view of a housing of an electric vehicle charging apparatus according to embodiments.
FIG. 1E illustrates a rear plan view of a housing of an electric vehicle charging apparatus according to embodiments.
FIG. 1F illustrates a rear plan view of a rear receptacle mount option of electrical connection of an electric vehicle charging apparatus according to embodiments.
Figure 1D:
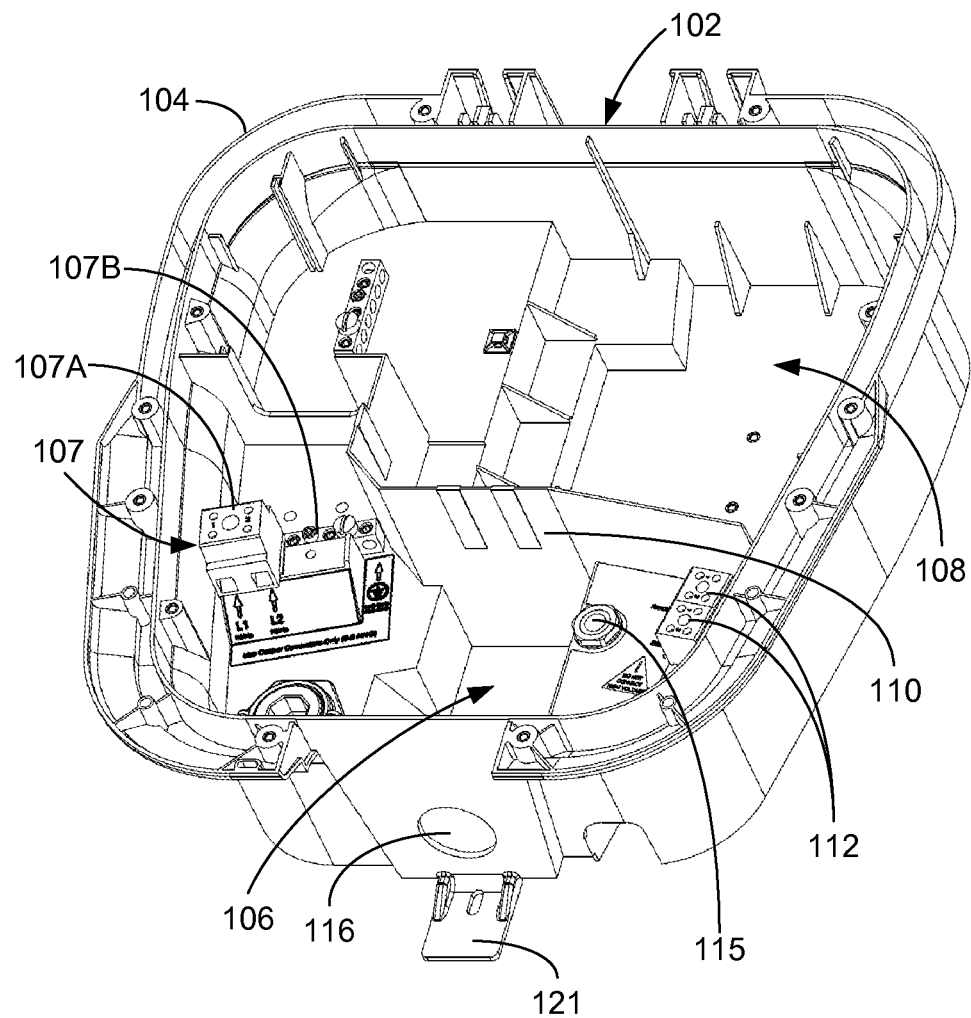

FIGS. 1A through 1F illustrate the components of the electric vehicle charging apparatus 100. The body 104 may include a number of internal cavities. A first front cavity 106 of the body 104 (e.g., at a lower section of the electric vehicle charging apparatus 100) may contain at least one electrical terminal 107. The at least one electrical terminal 107 may be a lug, lug assembly, quick connect, terminal block, or the like. In the depicted embodiment, a line terminal block 107A and a grounding terminal block 107B are shown. Other electrical terminal options may be used. The lower section of the electric vehicle charging apparatus 100 has been designed to properly route and terminate the various electrical connection options. FIGS. 1C and 1D illustrate an interior flexible wiring compartment as a first front cavity 106 easily assessable by removing or rotating the hinge out of the way. This first front cavity 106 may be appropriately sized to house either a single phase or a three phase wiring system, such as with an earth ground. FIG. 1D illustrates one of the flexibility features, and illustrates an interchangeable lug interface or terminal 107. The terminal 107 (providing an electrical connection between the incoming wires and electrical components of the electric vehicle charging apparatus 100) may be mounted via threaded metal inserts staked into the plastic molding, for example. This lug interface or terminal 107 may be fastened to the threaded insert by a suitable fastener. Various alternative lug interfaces or terminal designs or types can be selected and utilized on a common mounting platform within the first front cavity.

The body 104 may also include a second front cavity 108 (e.g., at an upper portion) that is adapted to house and contain high voltage components such as a contactor 109, high voltage wiring, connections to the SAEJ1772 connector, and one or more printed circuit boards (e.g., circuit board 453). The contactor 109 in the second front cavity 108 may be electrically coupled to the at least one terminal 107, and also to the charging cable 103. The contactor 109 may have a current rating of 30 A or greater and a voltage rating of 208V or greater, for example. The high voltage printed circuit board 453 may receive a high voltage (e.g., greater than about 110 V) from the contactor 109.

In another aspect, the electric vehicle charging system 100 may include one or more low voltage terminals 112 (e.g., dry contact inputs and/or outputs), which may be included in the first front cavity 106 and accessible by lifting or removing the lid 105. Accordingly, various signal and/or data inputs and/or outputs may be provided to and/or from a low voltage printed circuit board (e.g., 456). Optionally, an Ethernet terminal 114 (shown dotted in FIG. 10) may be provided in the first front cavity 106 and may be adapted to connect an Ethernet cable to the printed circuit board 456. A removable plug 115 in the first front cavity 106 may be used to receive a hard wired connection from the rear of the unit to the one or more low voltage terminal blocks 112 and/or the Ethernet terminal 114.

In this manner data communication with a home network cable (e.g., a CAT5e or similar cable), a utility service communication cable, or the like may be provided. For example, in one or more embodiment, a status of the electric vehicle charging apparatus 100 (e.g., powered, faulted, charging, charging state, charged, delay, or the like) may be remotely monitored. In one or more embodiments, the utility service may monitor and/or remotely shut down the electric vehicle charging apparatus 100 during periods of high electrical demand. Similarly, a home network cable (e.g., a CAT5e or similar cable) may be connected to a home automation system, garage controls, or other components in the home, such as a remote switch or breaker, or the like.

In more detail, the first front cavity 106 and second front cavity 108 may be separated by dividing wall 110. Hot(s), neutral, and ground conductors pass through a small opening in the dividing wall 110 and are connected to the contactor 109. A radio frequency interference (RFI) filter 111 may function to prevent high levels of unwanted radio frequencies from entering the enclosure via the line side conductors. The RFI filter 111 may be positioned so as to block and/or partially fill the small opening between the cavities 106, 108. As shown, a first wiring entry 116 is provided on the periphery of the body 104, such as at a bottom thereon. This first wiring entry 116 connects directly into the first front cavity 106, and may be a circular hole as shown in FIG. 1D. The first wiring entry 116 may have a diameter of between about 20 and 30 mm, for example. Other sizes may be used.

Figure 1E:
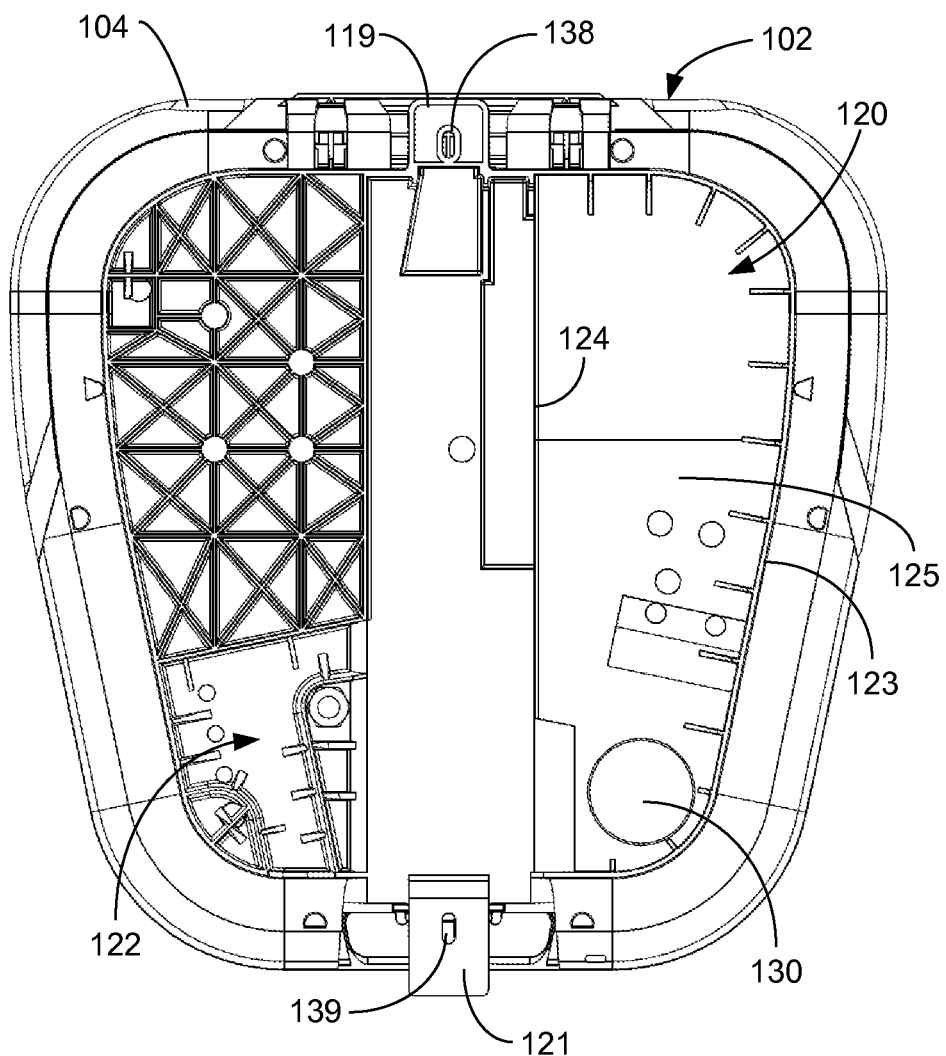

As shown in FIG. 1E, the body 104 of the housing 102 includes a first rear cavity 120, and may include a second rear cavity 122. The body 104 may include mounting features adapted to mount the electric vehicle charging system 100 to a structure 101. The mounting features may include an upper housing mounting feature 119 and a lower housing mounting feature 121, which may be molded tabs, for example. The first rear cavity 120 may be positioned on one side of the body 104 and may extend from a top to a bottom of the body 104, for example. The first rear cavity 120 may be at least partially formed by an outer sidewall 123, an inner sidewall 124, and an intermediate wall 125. The other side of the intermediate wall 125 forms part of the first front cavity 106 and second front cavity 108. The second rear cavity 122 may be configured and adapted to receive the charging cable 103 and a through connector 103S. The through connector 103S may be a sealed through connector.

One installation configuration is shown in FIG. 1C. The first wiring entry 116 may receive an outside electrical cord 128 with coupled outside electrical plug 129 (e.g., a NEMA plug) that is adapted to plug into a nearby electrical receptacle 508 (See FIG. 5A). The electrical receptacle 508 may be protected by a suitable ground fault circuit interrupter (GFCI). The outside electrical cord 128 and outside electrical plug 129 (e.g., a 240 V dryer plug) may be adapted to carry 220V, for example. As shown in FIG. 1C, any suitable connector 128C may be used to rigidly secure and pass the outside cord 128 into and through the first wiring entry 116. In particular, the connection through the first wiring entry 116 may be a sealed connection.

Figure 1F:
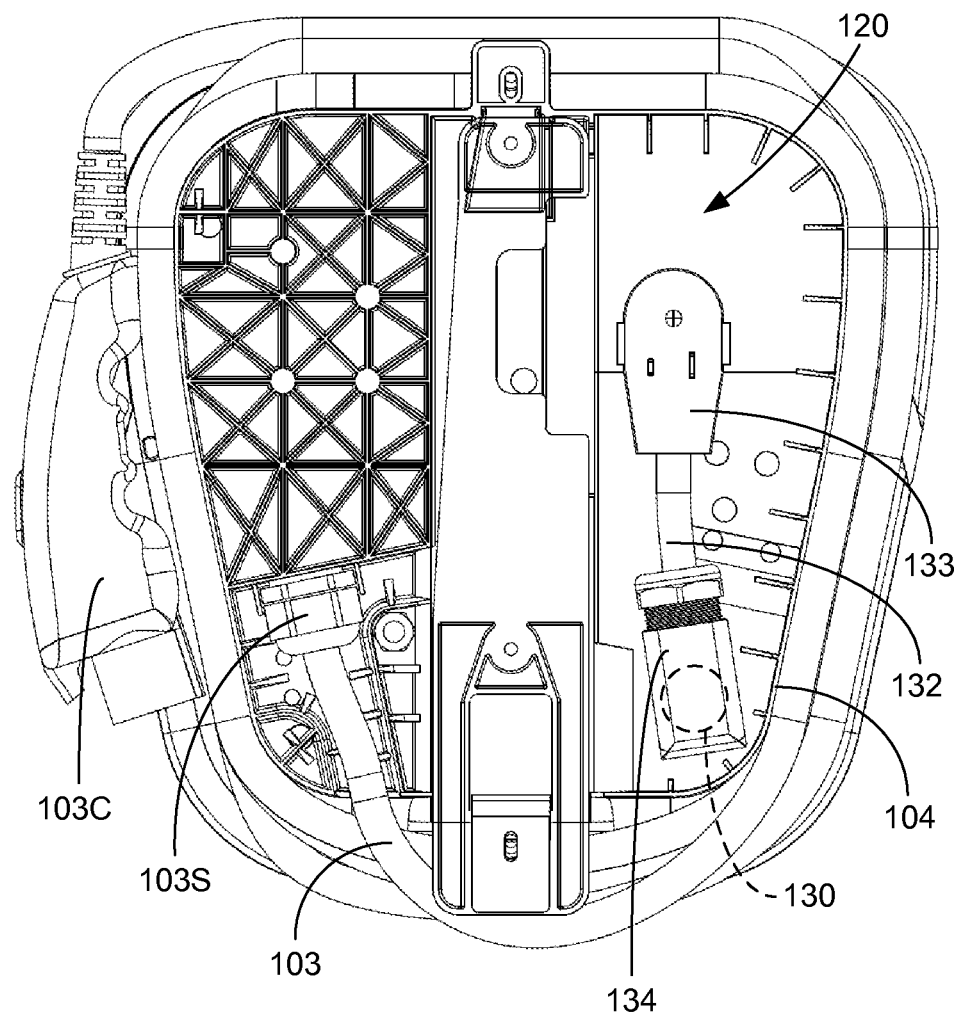

Again referring to FIG. 1E, a second wiring entry 130 may be provided. The second wiring entry 130 may be a hole and may provide a path between the first rear cavity 120 and the first front cavity 106 containing the one or more electrical terminals 107. The hole may be the same size as the first wiring entry 116. In a rear receptacle mount installation option embodiment, as shown in FIG. 1F, a suitable rear cord 132 with attached rear electrical plug 133 (e.g., a NEMA plug) may be received in the first rear cavity 120 and the rear plug 133 is adapted to be plugged into a receptacle (e.g., a wall receptacle) that is hidden behind the body 104 and within its footprint of the body 104. Within the footprint means that the receptacle is entirely hidden when looking from a front view orientation. The second wiring entry 130 may receive a through connector 134 that passes the rear cord 132 through the second wiring entry 130 and into the first front cavity 106 for electrical connection to the at least one terminal 107. The through connector 134 may be a sealed connector so that the rear wiring entry 130 into the front cavity 106 is entirely sealed. The first wiring entry 116 may be closed with plug in this embodiment. Plug may be a removable plug, and may also be a sealed plug, for example. Optionally, the rear cord 132 may simply pass through the second wiring entry 130 and be connected to the at least one terminal 107 in the first front cavity 106, if a sealed environment is not desired. Also shown in FIG. 1F, is the charging cable 103 and the connection from the second rear cavity 122 through into the second front cavity 108 via connector 103S.

In another installation option embodiment, a short length (e.g., 10-12 inches) of electrical conduit (e.g., 10-3) from a gang box mounted behind the location of the electric vehicle charging apparatus 100 may pass through the second wiring entry 130 and connect to the at least one terminal 107 in the first front cavity 106. In this manner, the electric vehicle charging apparatus 100 may be direct wired into a rear located gang box. Again, a sealed through connector (the same as connector 134) may be used to pass through the second wiring entry 130.

Thus, in all the embodiments described herein, the body 104 is structurally configured with a first wiring entry 116 and second wiring entry 130 to provide a plurality of electrical power connection options for electrical connection of electrical power to the at least one electrical terminal 107. The plurality of electrical power connection options include, an outside cord option, an outside direct wire option, a rear receptacle mount option, and a rear direct wire option.

Figure 2:
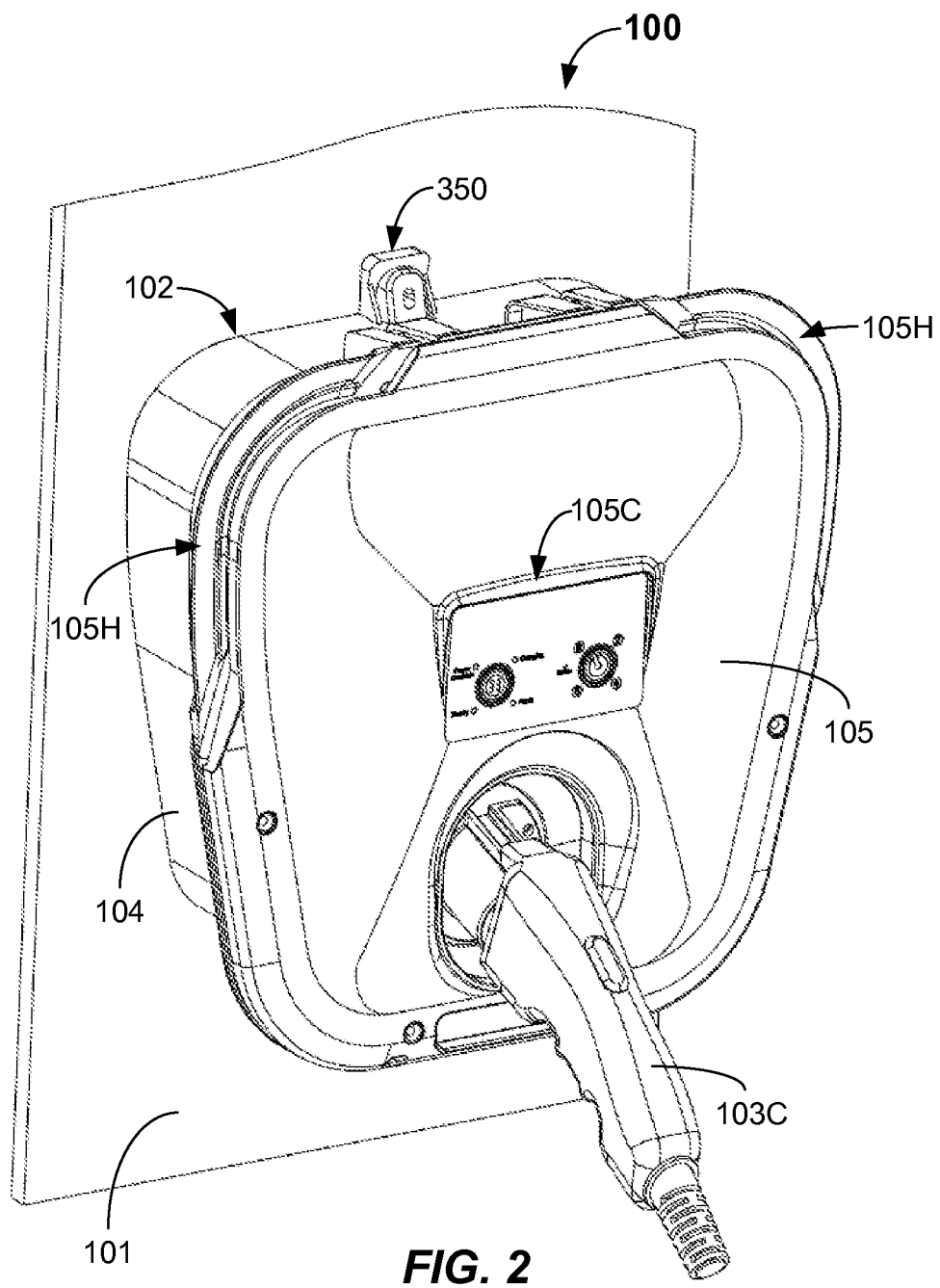
FIG. 2 illustrates an isometric front view of an electric vehicle charging apparatus with the charging cable not shown according to embodiments.

FIG. 2 illustrates the electric vehicle charging system 100 in either a rear receptacle mount configuration or a rear direct wired configuration. The charging cable 103 has been removed for clarity. The electric vehicle charging system 100 may include light exit regions 105H as discussed above positioned on opposite sides of the housing 102 that may light up to indicate a status of the electric vehicle charging system 100, such as a charge or other condition.

Figure 3A:
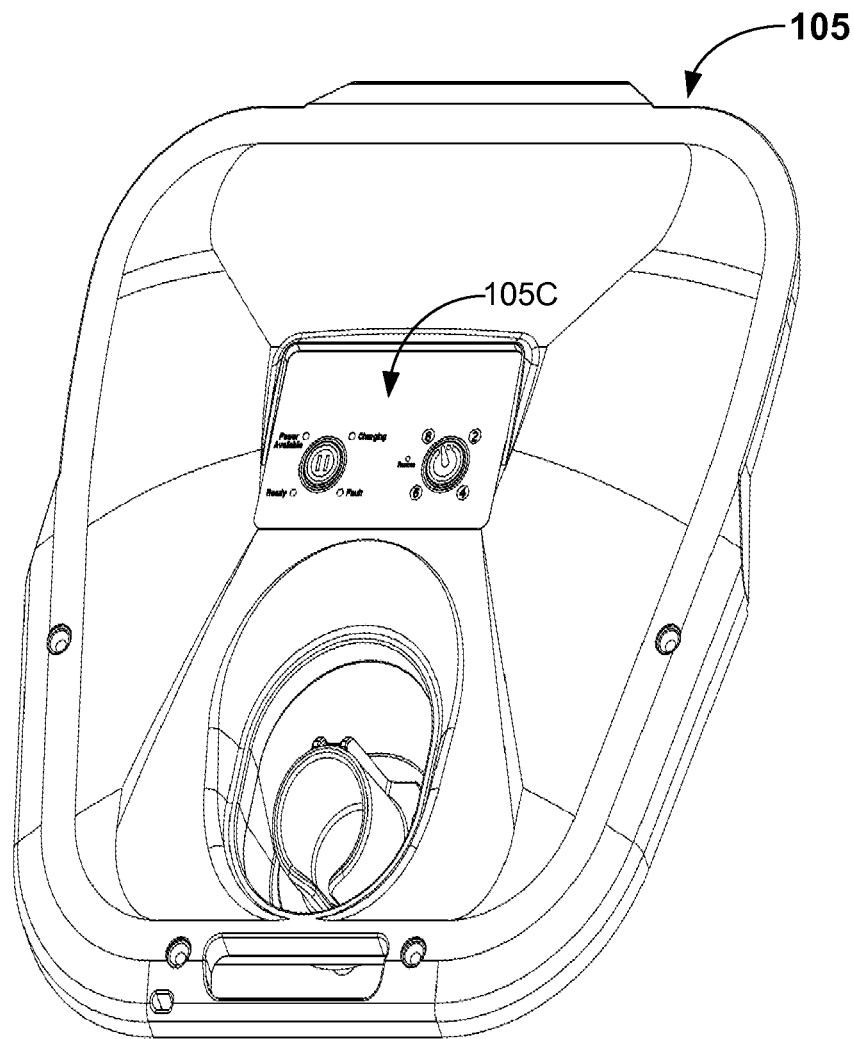
FIG. 3A illustrates a front isometric view of a hinged lid of an electric vehicle charging apparatus according to embodiments.

FIGS. 3A-3D illustrates various views of the hinged lid 105. In the depicted embodiment, as shown in FIG. 3A, a control panel 105C may be provided on a front exterior surface of the lid 105. The control panel 105C may allow the user to interact with and provide inputs into the electric vehicle charging system 100, and. In addition, the control panel 105C may provide status indications to the user.

Figure 3B:
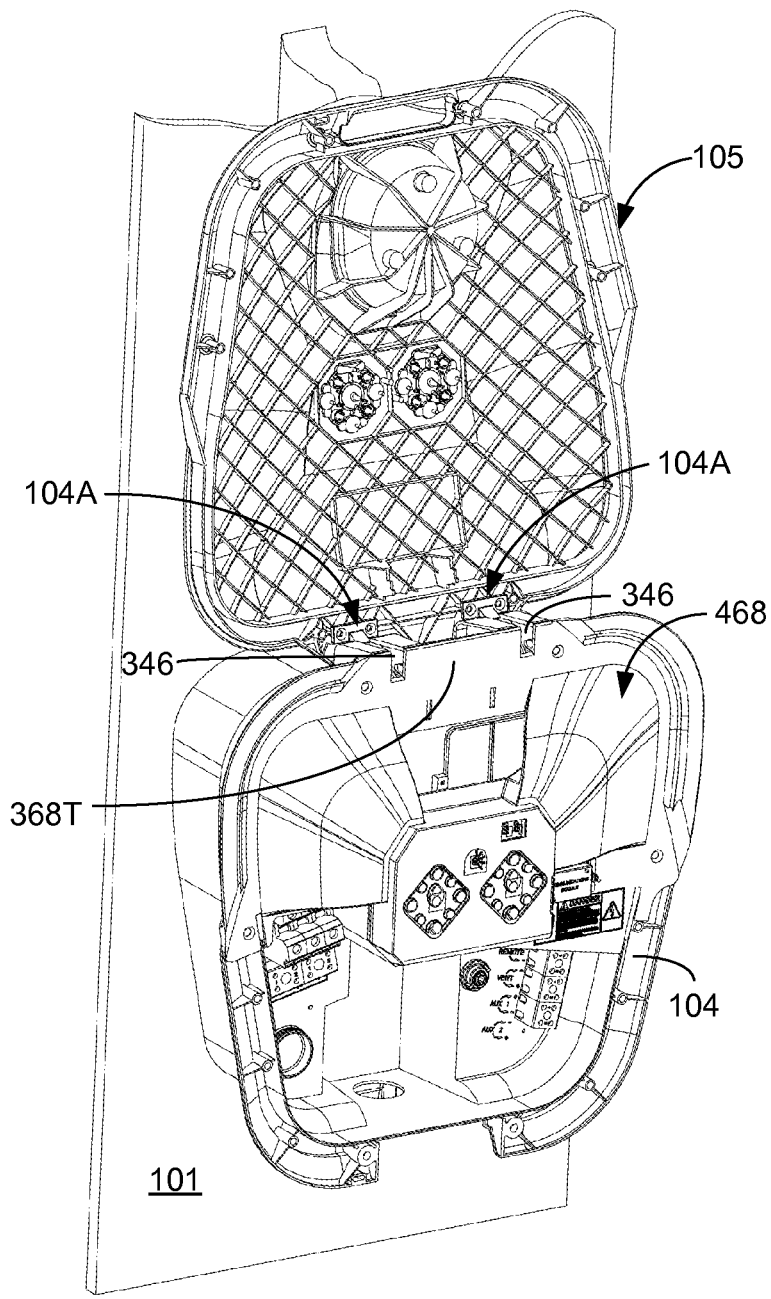
FIG. 3B illustrates a front isometric view of a hinged lid of an electric vehicle charging apparatus shown fully opened according to embodiments.
Figure 3C:
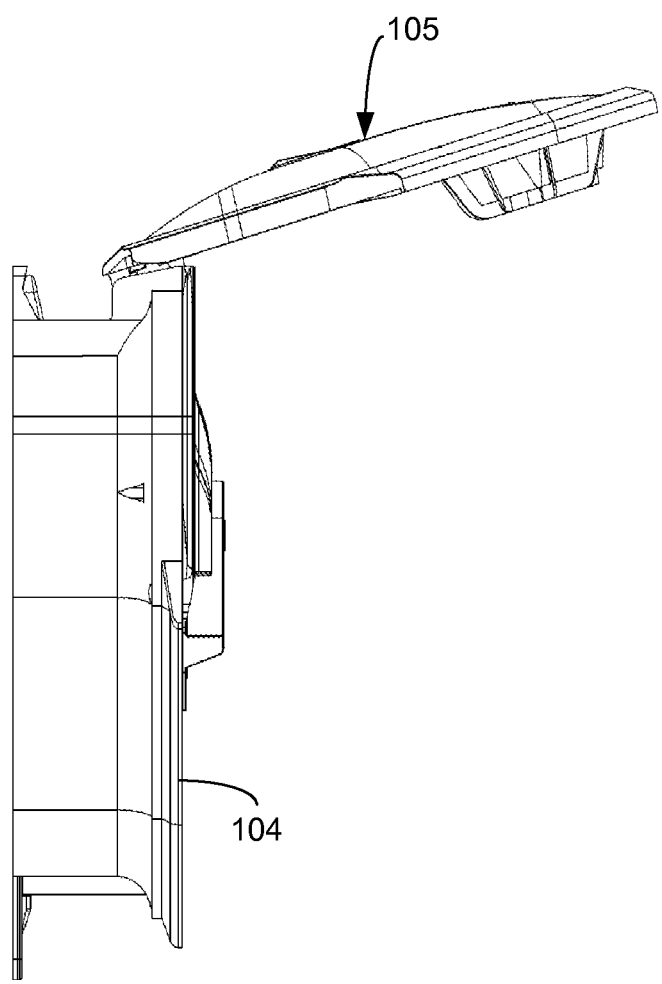
FIG. 3C illustrates a side plan view of a hinged lid of an electric vehicle charging apparatus shown locked opened according to embodiments.
Figure 3D:
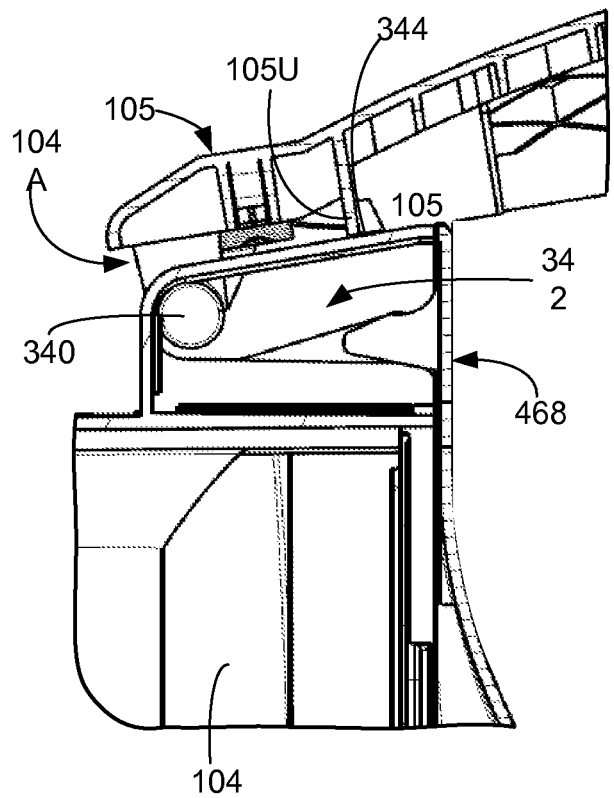
FIG. 3D illustrates a partial, cross-sectioned view of a hinged lid of an electric vehicle charging apparatus shown locked opened according to embodiments.
Figure 3E:
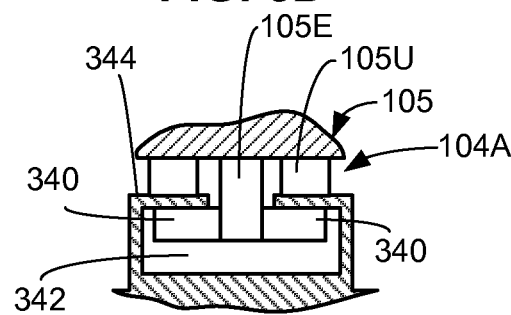
FIG. 3E illustrates a front schematic view of a hinge of an electric vehicle charging apparatus shown locked opened according to embodiments.
Figure 3F:
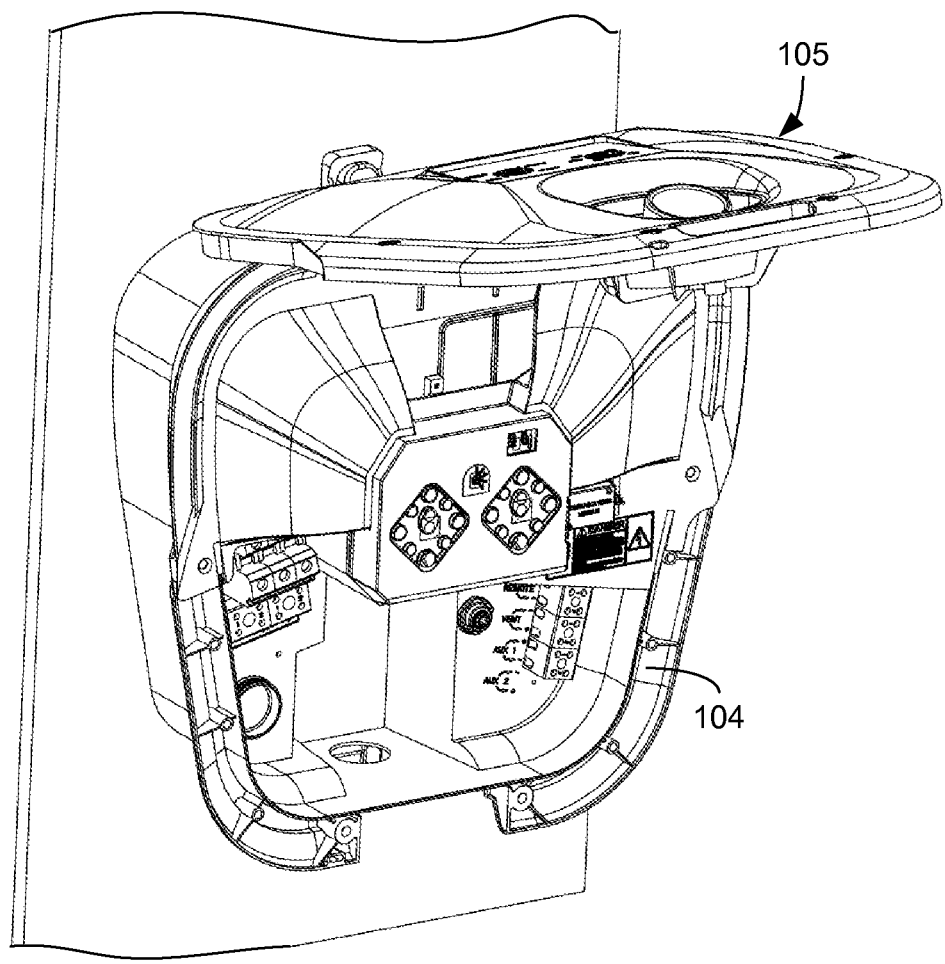
FIG. 3F illustrates an isometric view of a hinged lid of an electric vehicle charging apparatus shown locked opened according to embodiments.

FIGS. 3B, 3C and 3F illustrate the lid 105 in an opened configuration. The lid 105 may rotate on the hinges 104A relative to the body 104. In addition, as shown in FIGS. 3D and 3E, one or more hinge elements 340 per hinge 104A may be received in elongated pockets 342 that allow the lid 105 to slide back into the body 104. The lid 105 may remain in an upright position, and may rest against the structure 101 (e.g., wall), such as in FIG. 3B, or may be slid back such that an underside portion 105U of the lid 105 may make contact with a top wall 344 of the pocket 342. The hinge elements 340 may be one or more rounded posts that extend laterally from a lid extension 105E. The hinge elements 340 and the lid extension 105E may be molded with the lid 105 as an integral piece. Optionally, the extension 105E and hinge elements 340 may be molded as a separate items at attached by fasteners to the lid 105, as shown in FIG. 3B. The pocket 342 may be closed by any suitable structure, such as a top portion 468T of the light guide 468 (See FIG. 3B). Thus, in the FIG. 3C-3F configuration, the lid 105 may be held in a generally horizontal orientation. To reclose the lid 105, the user will simply pull out on the lid 105 until the hinge elements 340 contact the top portion 468T of the light guide 468 wherein the lid extensions 105E may be received in the clearance slots formed in the top portion 468T of the light guide 468 (See FIG. 3B).

Figure 4A:
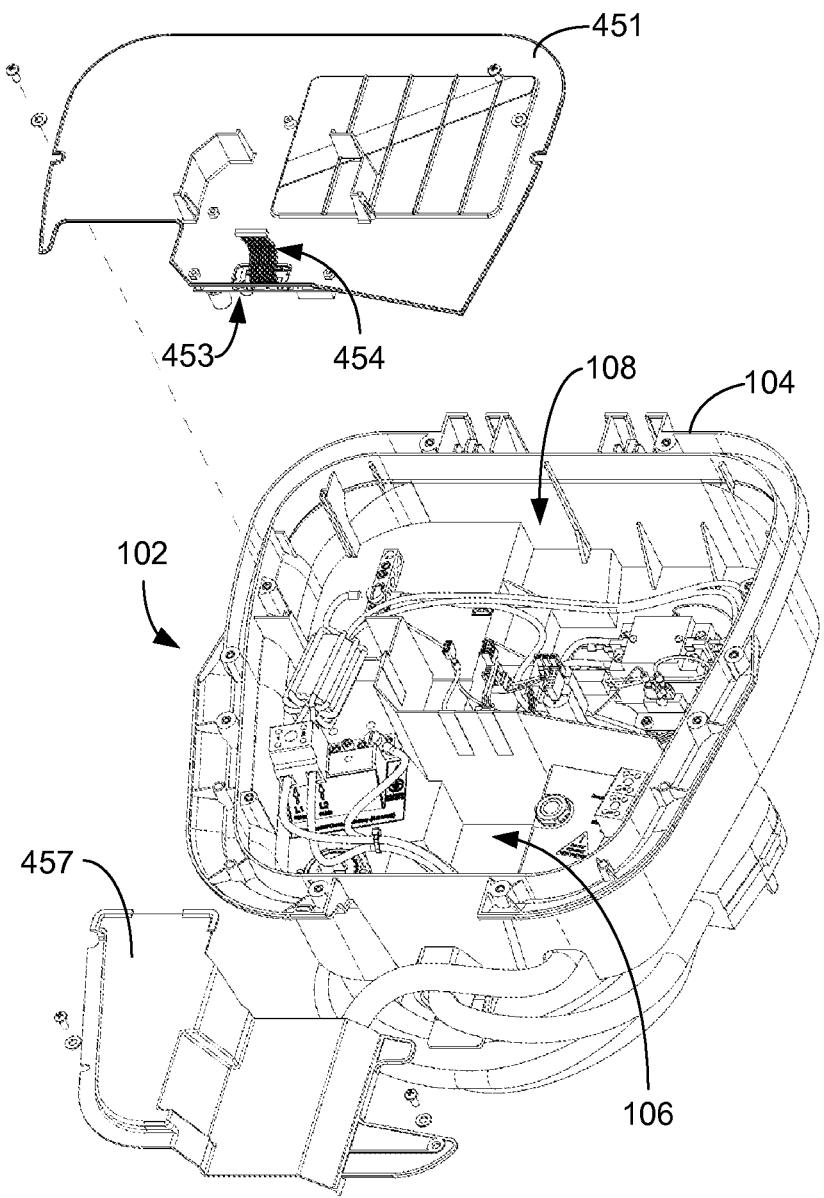
FIG. 4A illustrates a partial exploded view of a first inner cover and a safety cover of an electric vehicle charging apparatus according to embodiments.

FIG. 4A illustrates an isometric view of a body 104 of the housing 102 with a first inner cover 451 shown removed. The first inner cover 451 may be secured to and close the front of the second front cavity 108. A first printed circuit board 453 may resides on a back side of the first inner cover 451 and may be connected thereto. The first inner cover 451 may be a suitable flame-rated plastic, such as described above. A second printed circuit board 456 (FIG. 4B) is connected to the printed circuit board 453 by a suitable cable, such as ribbon cable 454. Also shown in FIG. 4A is a safety cover 457 that is received in the first cavity 106 and covers the one or more electrical terminals 107 and protects the user from high voltage shock hazards. The safety cover 457 may be manufactured from a flame-retardant plastic such as described herein, and may be fastened to the body 104 by screws or the like.

Figure 4B:
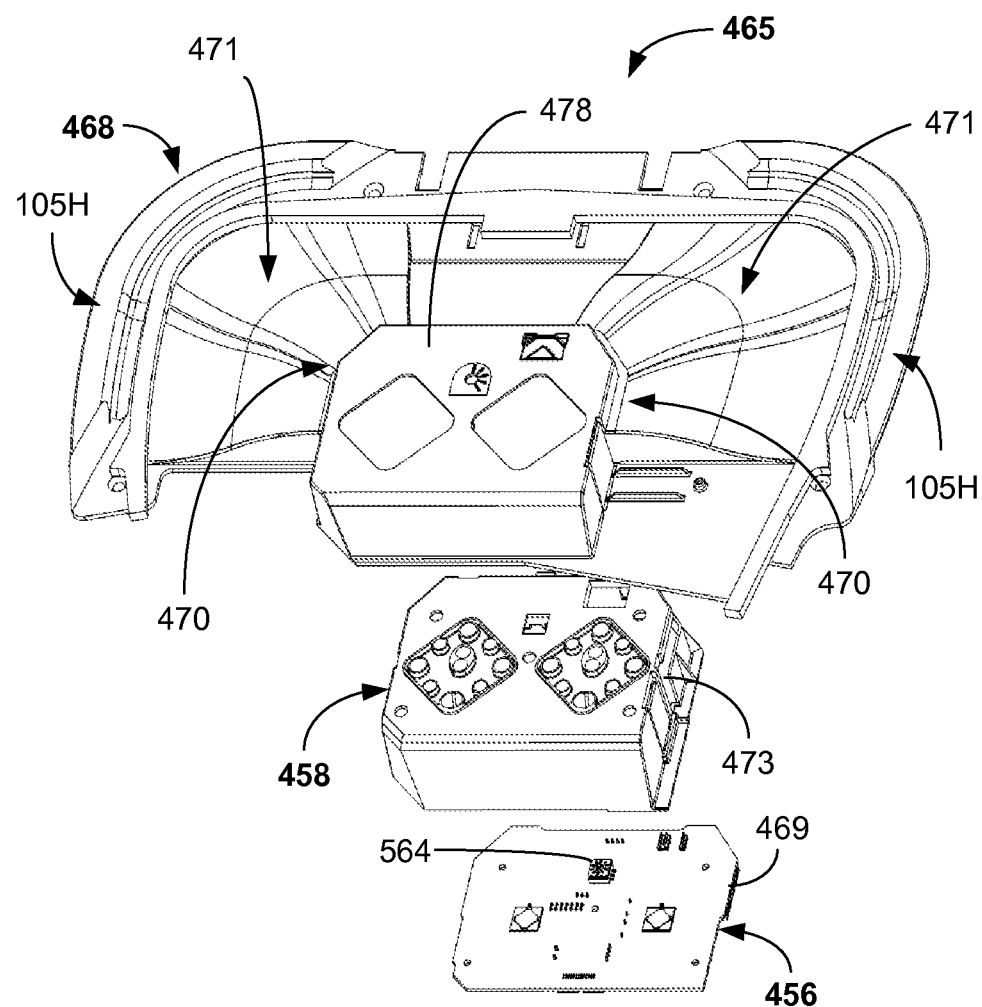
FIG. 4B illustrates a partial exploded view of several components of a light guide assembly of an electric vehicle charging apparatus according to embodiments.

FIG. 4B illustrates an exploded view of a light guide assembly 465. The light guide assembly 465 mounts via fasteners to the body 104 of the housing 102 (See FIGS. 4C and 4E) and may be mounted over the first inner cover 451. The light guide assembly 465 may include at least a light guide 468 and one or more light sources 469. In the depicted embodiment, the light guide assembly 465 includes a barrier shield 458, and the second printed circuit board 456.

The second printed circuit board 456 may include one or more light sources 469 mounted thereon or otherwise coupled thereto. The light sources 469 may be one or more LEDs, such as side-firing LEDs, for example. In the depicted embodiment, the side firing LEDs are mounted along one or more edges of the second printed circuit board 456, and outwardly emit light in a direction generally along the plane of the board. The light sources 469 may emit one or more colored light emissions into the light guide 468. The light is conveyed by the light guide 468 and displayed at the one or more light exit portions 105H on the exterior of the housing 102. In the depicted embodiment, the one or more light sources 469 may be mounted on opposite sides of the second printed circuit board 456 and may project light to the sides and/or toward a top of the electric vehicle charging apparatus 100.

For example, the one or more light sources may comprise white, green, red, blue, yellow, orange, or any other color. The colors may be used to display a status about the electric vehicle charging apparatus 100. For example, the displayed colors may be used to convey at least one of readiness to charge, a charging state (e.g., percent of charging capacity of the unit), a state of charging completeness (e.g., 25%, 50%, 75%, 100% or charge completed, and/or distance travelable by the EV), a fault, a fault condition, a remote access condition (e.g., an override mode), an operational mode, a communication mode (e.g., data communication taking place), charging, charge delay time, or the like. Other status information may be displayed.

In one or more embodiments, green may indicate a ready to charge status. In one or more other embodiments, one or more colors may flash on and off to indicate a status, such as any one of the above. For example, a flashing green light may signify a charging status, whereas continuous green light may signify a completion of charging of the electric vehicle charging apparatus 100. Yellow may signify a 50% charge, for example. Red may indicate a fault mode. Blue may indicate a remote condition, such as where the residential power service provider (e.g., utility company) communicates with and/or remotely shuts down the electric vehicle charging apparatus 100. Any combination of flashing lights and/or color emissions may be used. If more than one light exit portions 105H are used, the lights may flash together (e.g., in unison), or may alternate or toggle out of synchronization. The flashing may be provided in any pattern, such as evenly or unevenly. Additionally, different colors may be displayed on each light exit portion 105H. One light exit portion 105H may flash, while the other may display a solid colored light.

Figure 4C:
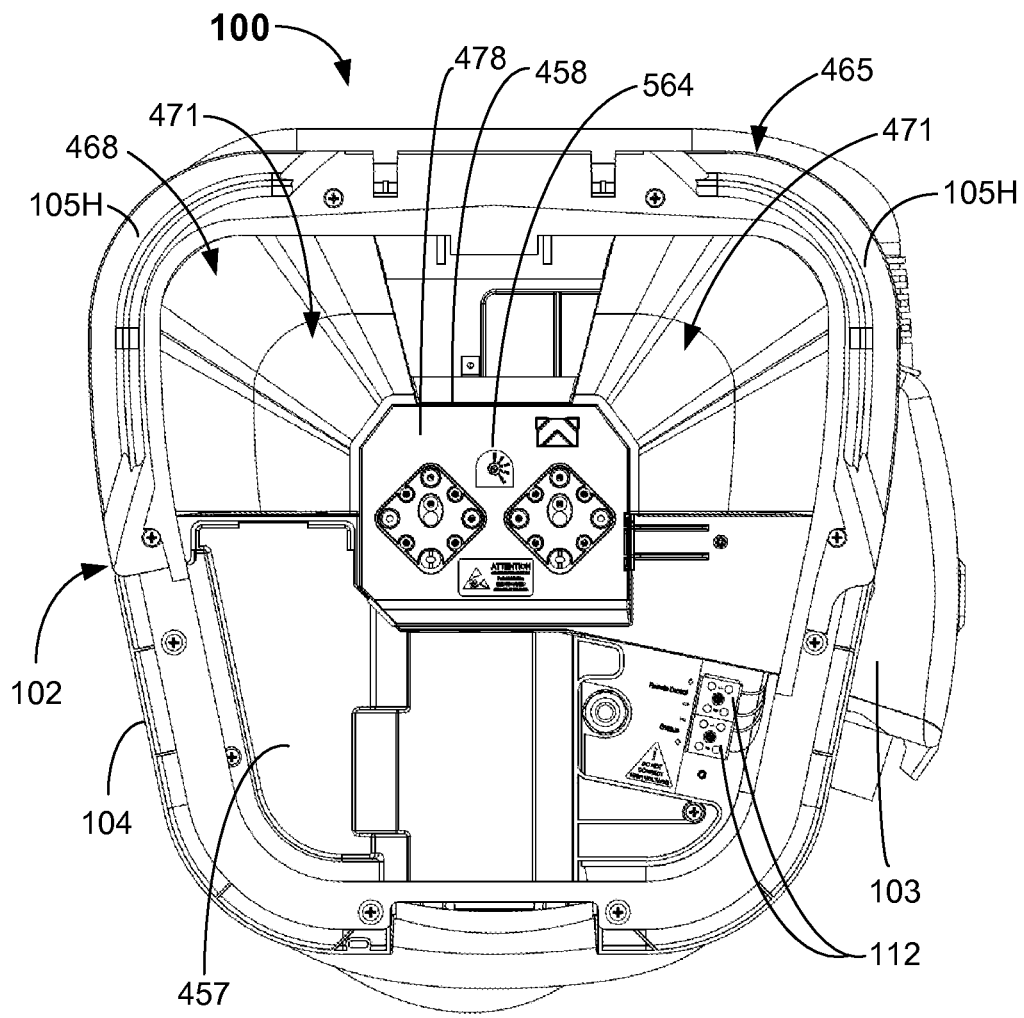
FIG. 4C illustrates a front plan view of various components of an electric vehicle charging apparatus with the hinged lid not shown according to embodiments.
Figure 4D:
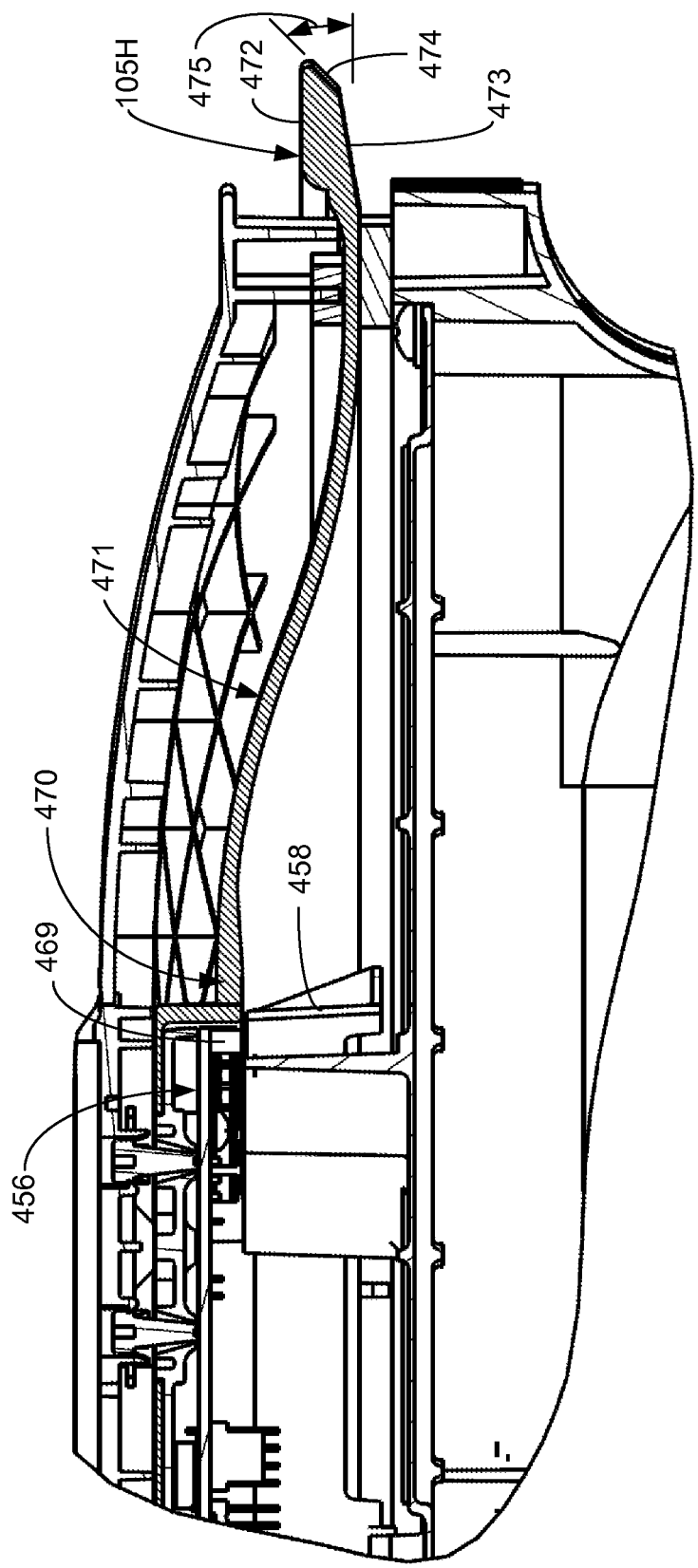
FIG. 4D illustrates a cross sectioned side view of a lid and light guide of an electric vehicle charging apparatus according to embodiments.
Figure 4E:
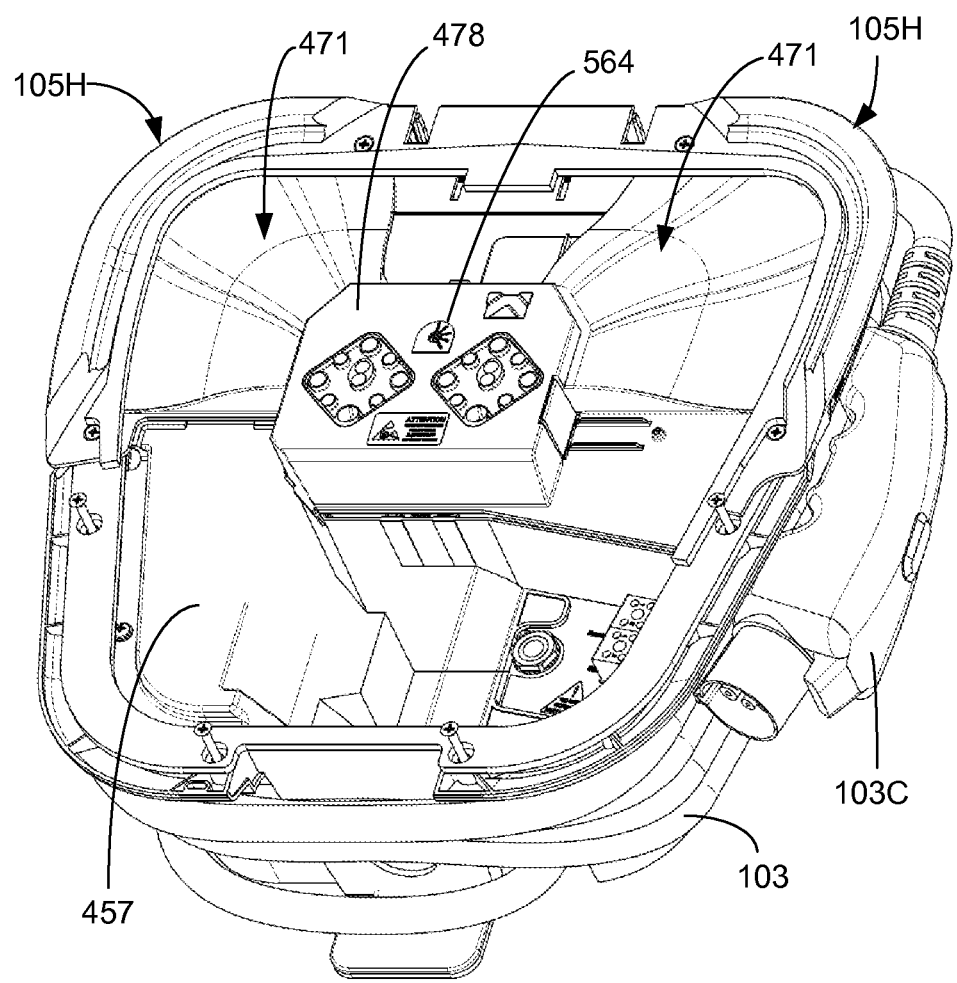
FIG. 4E illustrates an isometric view of an electric vehicle charging apparatus with lid removed according to embodiments.

As best shown in FIG. 4D, light from the one or more light sources 469 may be emitted and travel in the light guide 468. The light guide 468 receives the light at one or more light receiving region 470 located directly adjacent to the one or more light sources 469, and conveys the light along one or more light guiding regions 471, to one or more light exit regions 105H. The one or more light receiving regions 470 and the one or more light guiding regions 471 may reside under the lid 105 when the lid 105 is closed, and the one or more light exit regions 105H may be viewable adjacent to edges of the lid 105, when the lid 105 is closed. The one or more light exit regions 105H may include an expansion zone wherein a thickness of the waveguide is increased upon transition to the light exit regions 105H. The light exit regions 105H may include a first forward facing surface 472 and may include a rear facing surface 473, and a side facing surface 474. The side facing surface 474 may be oriented so that they other than parallel with a direction of travel of the light emissions exiting the light guiding region 471. In particular, the side facing surface 474 is the surface that is lit, like a halo. The side facing surface 474 should be angled relative to the light emitted from the waveguide portion 471 for maximum halo effect. The angle of tilt of the surface 474 may be selected such that the light beam is spread across substantially all of the surface 474. An angle 475 of between about 30 degrees and 50 degrees may be used. Other angles may be used. The thickness of the light guiding region is substantially constant along a substantial portion of the length, and may be between about 2.2 and about 2.5 mm thick. Other thicknesses may be used.

Figure 4F:
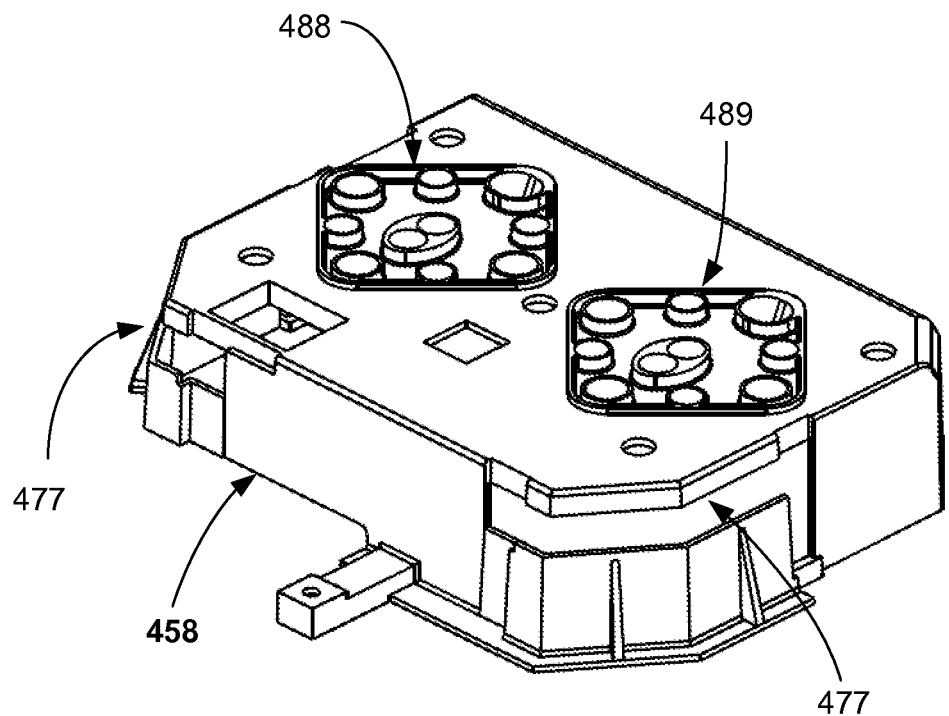
FIG. 4F illustrates an isometric view of a barrier shield of a light guide assembly according to embodiments.
Figure 4G:
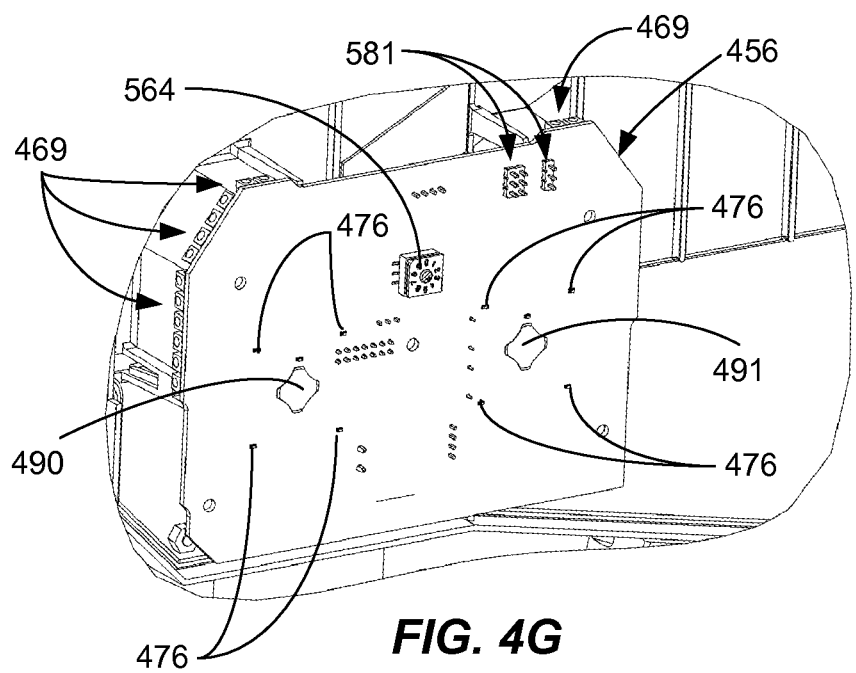
FIG. 4G illustrates an isometric front view of a second printed circuit board according to embodiments.

In the depicted embodiment, as best shown in FIGS. 4F and 4G, the second printed circuit board 456 is located and secured in a pocket just below the under surface of the shield 458. This second printed circuit board 456 may house the microcontroller 558 (FIG. 5B), side emitting light sources (LEDs) 469, and may include front emitting LEDs 476. The light sources 469 (e.g., side emitting LEDSs) may emit light through one or more restrictive apertures 477 formed in the shield 458. The restrictive apertures 477 in the shield 458 may be side slots that may be positioned adjacent to the one or more light sources 469 that may be vertically oriented (as installed) and may be adapted to limit spread of light emitted from the one or more light sources 469. Light emissions that are generated by the one or more light sources 469 response signals from the microprocessor 558, may pass into the one or more light guides 468 at the light receiving regions 470, channel light into the one or more light guiding regions 471, and emit light at the one or more light exit regions 105H. The light exit regions 105H may be positioned on one or more portions of the electric vehicle charging apparatus 100 so that they are readily viewable by a user.

In the depicted embodiment, the light exit regions 105H are positioned on opposite sides of the housing 102. The light exit regions 105H may include a scattering surface treatment such as a roughened surface or other surface discontinuity (e.g., small v-shaped grooves) on the side facing surface 474 where the light exits that functions to scatter the light delivered thereat. The surface scattering surface treatment may provide a frosted surface on some or all of the light exit regions 105H. The scattering surface treatment may be rougher than a surface of the light guiding region 471, for example. The scattering surface treatment may be provided by bead blasting a mold used to mold the light guide 465 at the locations of the mold that form at least the side facing surface 474 of the light exit regions 105H. The light guide 468 may be made from a clear material, such as clear plastic. The plastic may be a polycarbonate resin thermoplastic, a polyacrylate, or other suitable clear plastic material, for example. The light guide 468 may include a center portion 478 that is adapted to fasten to the shield 458 such that the light sources are properly aligned with the light receiving regions 470.

Figure 5B:
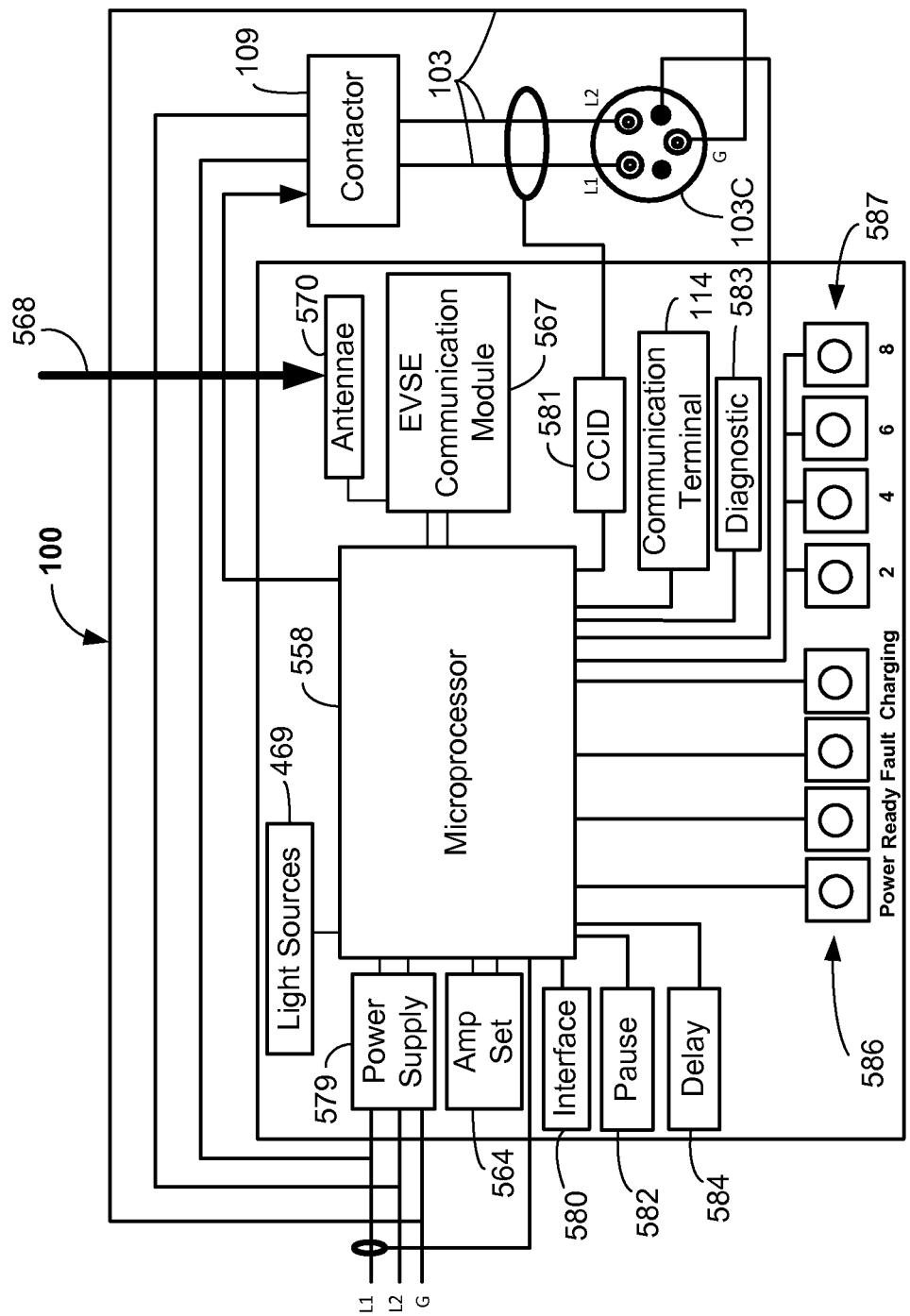
FIG. 5B is an electrical block diagram of an electric vehicle charging apparatus according to embodiments.

FIG. 5B illustrates a block diagram of an example embodiment of an electric vehicle charging apparatus 100. The electric vehicle charging apparatus 100 may include maximum amperage set switch 564 that functions to limit the maximum amperage that the EV 504 can request from the electric vehicle charging apparatus 100. The amperage adjustment feature offers a mechanical means of limiting the current to the EV 504. This limit may be desirable either due to existing limitations of the electrical infrastructure of the residential electrical delivery system (e.g., load center), or a charging methodology that may "load shift" the energy demands of the electric vehicle charging apparatus 100 across a wider time of the day.

One embodiment of the amperage adjustment feature 564 is illustrated in FIG. 4B-4C. In this embodiment, the printed circuit board assembly 456 is located and secured in a pocket just below the surface of a shield 458. This printed circuit board 456 houses the microprocessor 558 of the electric vehicle charging apparatus 100 and includes a maximum amperage set switch 564. In this embodiment, the maximum amperage set switch 564 may be a multi-position rotary switch. Optionally, the maximum amperage set switch 564 may be a dip switch or a series of 2 or 3 position switches. When the user rotates the switch, such as with a screwdriver (FIG. 4D), the maximum amperage set switch 564 signals an EVSE state machine located on the printed circuit board assembly 456 to adjust a parameter of the charging. This data is then communicated to the EV 504 via industry standard protocol SAE J1772, for example, and the electronics inside the EV 504 limit the amperage delivered through the electric vehicle charging apparatus 100. By using a design wherein the access is recessed behind a surface of the center portion 478 so that it requires a small screwdriver, a probability that the switch 564 will be accidently adjusted is reduced. This switch 564 can also easily be covered by a small piece of plastic or epoxy to reduce the likelihood that it is adjusted in the field by unqualified end users. In some embodiments, a small knob (e.g., plastic knob) may be molded on the top of switch 564 to allow rotation by hand. In any event, adjustment may not take place in the depicted embodiment without removing the lid 105 to gain access.

Again referring to FIG. 5B, the contactor 109 is connected to charge cable 103, which terminates at the electrical connector 103C. The electrical connector 103C may be a SAE J1772 connector and is adapted to couple to a receiving connector on the EV 504 (FIG. 5A). The electric vehicle charging apparatus 100 may further include a communication terminal 112, such as a differential serial port RS485 for data communication, which may be provided in the first inner cavity 106, for example. Suitable power supply and conditioning 579 may be provided on the circuit board 456 or on the circuit board 453. In the depicted embodiment, a two board configuration is shown. However, it should be recognized that the various components may be combined on one board or separated into two or more boards. In the depicted embodiment, the printed circuit board 456 may be a low voltage board. Low voltage, as used herein, mean less than about 24V, for example. A user interface 580, such as one or more push buttons, an LCD screen, a touch screen or the like may be used, and may be adapted to allow a user to receive and/or input into the electric vehicle charging apparatus 100. A Charging Circuit Interrupting Device (CCID) 581 may be provided to monitor the differential current among the current carrying conductors and indicate the presence of a ground-fault to the microprocessor 558 as needed to provide personnel protection, such as per UL 2231, for example. A separate pause button 582 may be provided, as well as a delay input button 584 to enable input of delayed charging for an amount of delay time (e.g., 2, 4, 6 or 8 hours). Other visual indicators 586 may be provided and adapted to indicate whether the electric vehicle charging apparatus 100 is powered, ready, in a fault condition, or is charging. Other small indicators may be provided, such as on the lid 105. A diagnostic terminal 583 may be used to enable communications with the printed circuit board 456.

In some embodiments, the visual indicators are provided on a surface of the lid 105. The configuration of the visual indicators 586, 587 and the various inputs to the electric vehicle charging apparatus 100 will now be described in detail with reference to FIGS. 4H and 4I. These visual indicators 586, 587 may be produced by one or more LEDs, for example. For example, the visual indicators 586, 587 may be provided by forward-projecting light sources 476, for example. The light sources 476 may be forward firing LEDs that may be mounted on the printed circuit board 456. The light sources 476 may project light forward through a plurality of channeling elements 488, 489 formed in the barrier shield 458, and through the lid 105 so that status information can be displayed on the surface of the lid 105. Accordingly, the status may be displayed on the front of the lid 105 such that it may be readily viewable by the user. Various of the small indicator lights may be lit based upon the detected status.

Figure 4H:
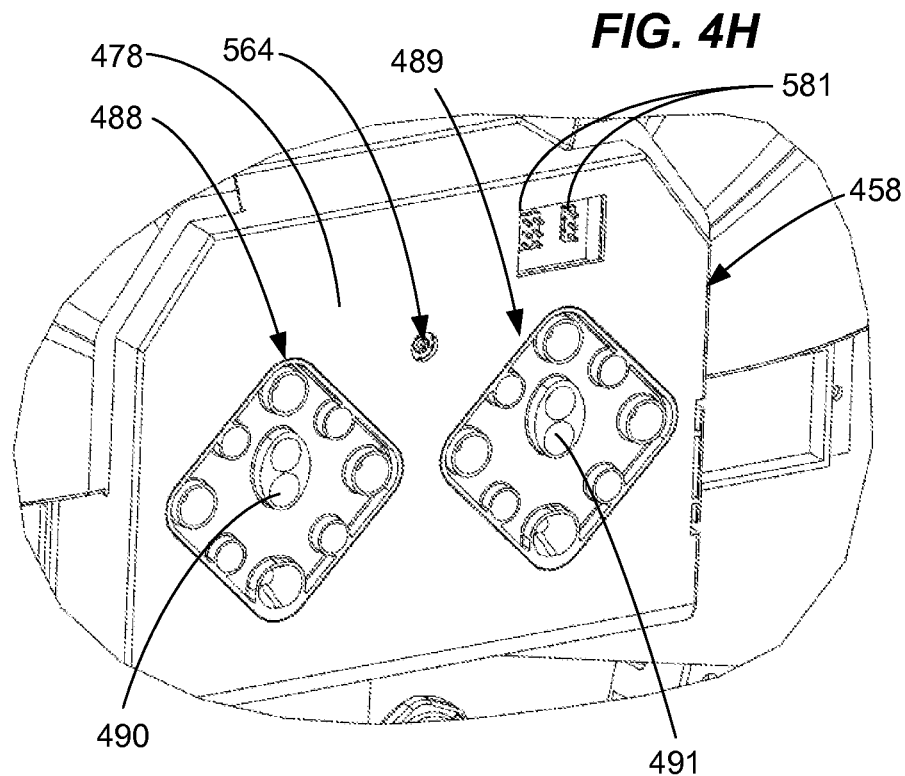
FIG. 4H illustrates an isometric front view of a plurality of light channels of the barrier shield according to embodiments.

In FIG. 4H, the shield 458 may include a first plurality of channeling elements 488 that may convey a status of the electric vehicle charging apparatus 100 to the lid 105. Displayed status may include power available (e.g., orange), charging (e.g., green), ready (e.g., green), or fault (e.g., red), or pause (e.g., blue). Other colors may be used. Similarly, the second plurality of channeling elements 489 may convey a delay time of the electric vehicle charging apparatus 100 to the lid 105, such as 2, 4, 6, or 8 hours, or the like. Nine channels are shown in FIG. 1H for each of the groups of channeling elements 488, 489. Some or all of the channels may be used. At a location relative to the shield 458, such as at a center of one or both of the plurality of channeling elements 488, 489, one or more switches 490, 491, such as domed micro-switches may be provided. The switches 490, 491 may be mounted on the printed circuit board 456, for example. The switches 490, 491 may be operable by buttons 582, 584 mounted on the lid 105.

Figure 4I:
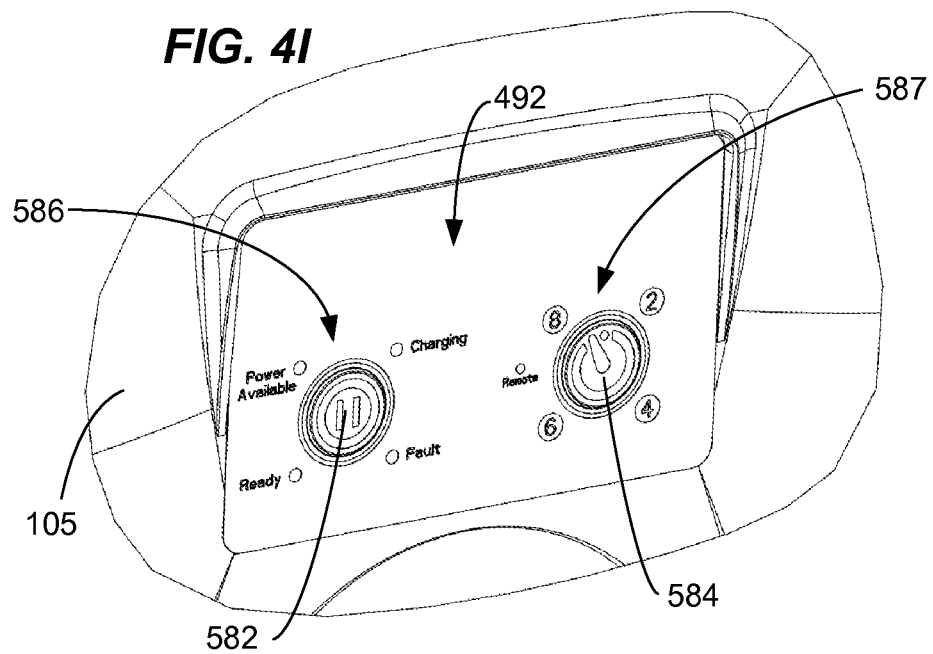
FIG. 4I illustrates an isometric front view of a control panel on the lid of the electric vehicle charging apparatus according to embodiments.
Figure 4J:
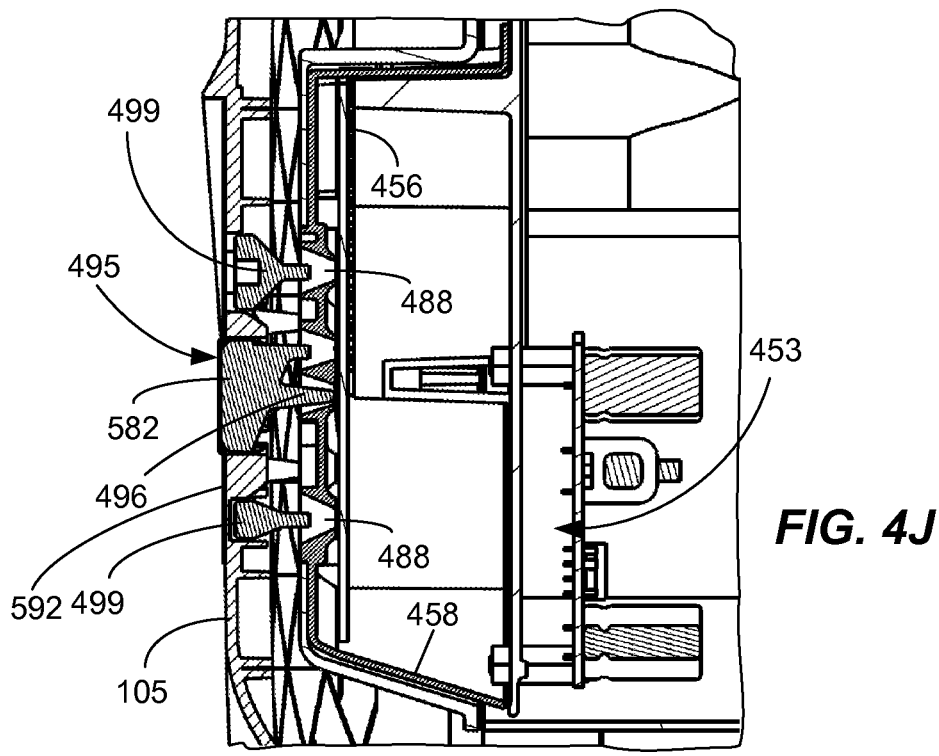
FIG. 4J illustrates a partial cross-sectional side view of a control panel on the lid interfacing with a printed circuit board located behind the barrier shield of the electric vehicle charging apparatus according to embodiments.

As shown in FIG. 4J, as the button 582 is depressed, a post 496 coupled to the button 582 may operate to make physical contact with the switch 490. This toggles the switch 490. For example, as shown in FIG. 4I, pressing the pause button 582 may pause (or start) the charging by the electric vehicle charging apparatus 100. Pressing it again may start the charging again. Pressing both buttons 582, 584 in unison may be used to turn off the light guide assembly 465. A light may be projected to indicate the pause status next to the word "pause" on a membrane (e.g., a thin polycarbonate film) adhered to the lid 105 and in contact with the front of the button 582. As depicted, four other lights may be projected through various ones of the plurality of channeling elements 488, depending upon the status (ready, power available, charge, or fault). Other numbers of lights and statuses may be displayed. Similarly, depressing button 584 may likewise toggle the switch 491 and may be used to set the delay time (e.g., 2, 4, 6, 8 hours). Depending on the condition of the switch 491, one of the lights corresponding to one of the plurality of channeling elements 489 will be lit. Thus, the delay time may be indicated on the lid 105 by the status indicators.

Figure 4K:
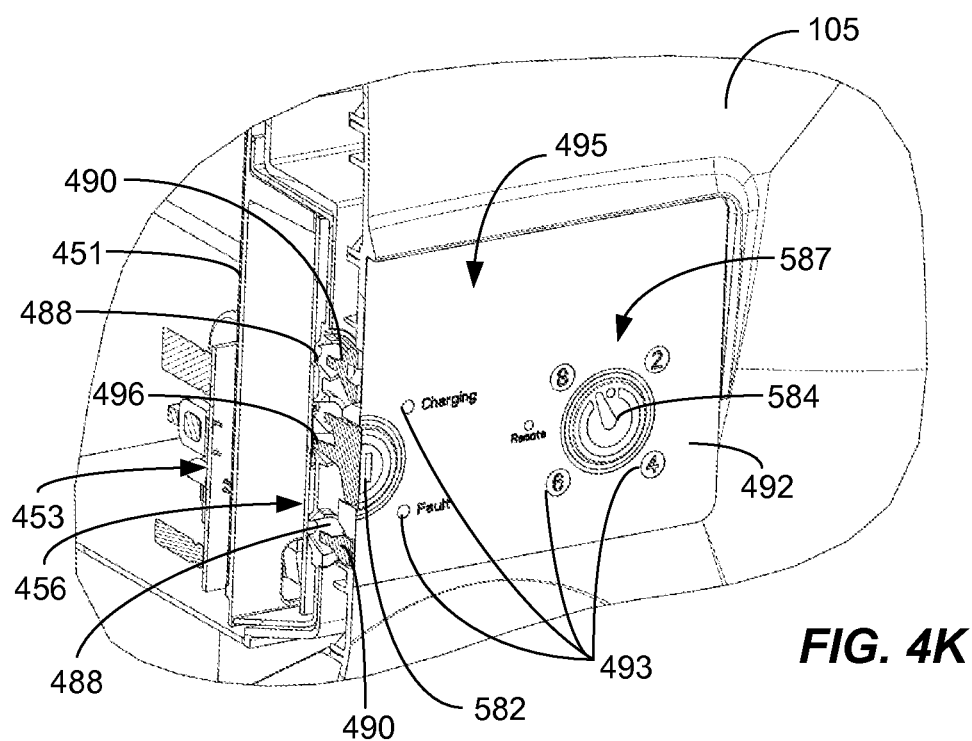
FIG. 4K illustrates a partial cross-sectional isometric view of the control panel on the lid interfacing with a printed circuit board according to embodiments.
Figure 4L:
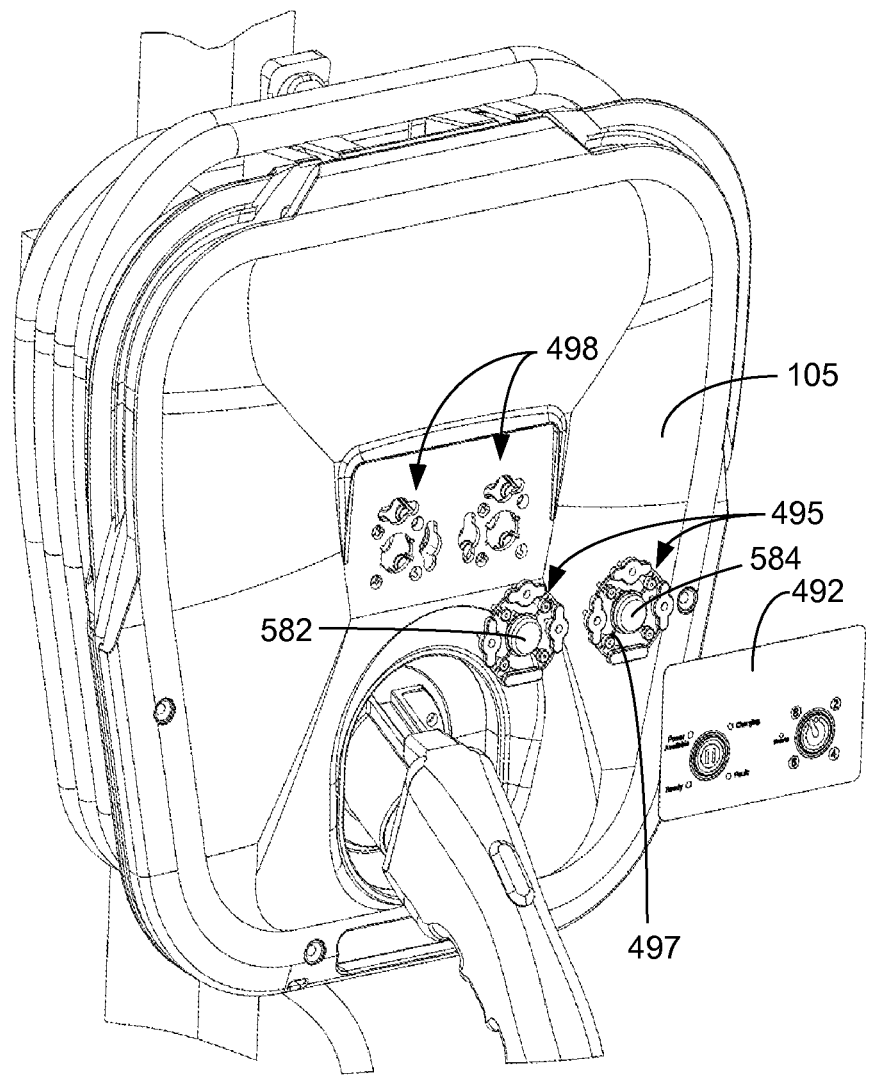
FIG. 4L illustrates an exploded isometric view of the control panel components according to embodiments.

As shown in FIGS. 4J and 4K, toggling of the pausing operation and the delay operation may take place through the lid 105. Likewise, status indications may be displayed on the lid 105. This is accomplished while still allowing the lid 105 to be removed or hinged such that it may rotate out of the way. Contact with the switches 490, 491 on the printed circuit board 456 is provided by contactors such as posts 496 that are flexibly mounted to the lid 105 and coupled to the buttons 582, 584. The posts 496 may be part of a button and indicator assembly 495 wherein the buttons 582, 584 are flexibly mounted to the lid 105 by one or more spring elements such as small beams 497 (only one labeled). Light passing through the light channels 488, 489 from the light sources 476 may be received in guide elements 499 and conveyed to the surface of the lid 105. Other suitable means for conveying the light to the surface of the lid 105 may be used. A control panel face plate 492 may be provided (e.g., adhered) on the lid 105 and over the buttons 582, 584 and the button and indicator assembly 495. This locates the button and indicator assembly 495 within recesses 498 formed in the lid 105. The control panel face plate 492 may be a thin film membrane, a flexible sheet, or a molded elastomer member (e.g., opaque rubber or silicone). The buttons 582, 584 may be of any suitable shape and size and the posts 496 thereof may be of any suitable shape to contact the switches 490, 491. The various active guide elements 499 are aligned with clear holes in the face plate 492. Accordingly, it should be understood that this embodiment of the invention allows status information to be displayed in lighted form on the lid 105 without any electrical connection to the lid being required. Thus, the lid is devoid of an electrical connection. Additionally, according to aspects of the invention, detailed status information may be displayed on the lid 105, while general state information may be displayed at the one or more light exit portions 105H via displayed one or more colors, one or more flashing lights, or combinations thereof.

In some embodiments, the electric vehicle charging apparatus 100 may include a communication module 567 that is adapted to wirelessly communicate with other devices or systems. The EVSE communication module 567 may have an antenna 570 connected to the communication module 567 and adapted to send and receive wireless signals 568 according to a suitable protocol to and from a device or system. For example, the communication module 567 may be used to communicate wirelessly with a smart grid node of a utility, a smart meter of a utility, a home computer network, an electrical load panel, an internet portal so as to link to a service provider, such as to perform diagnostics, software updates, or the like. Any suitable communication protocol may be used, such as ZigBee, Wi-Fi, Wi-MAX, Bluetooth, Dash 7, EnOcean, or the like.

Figure 6:
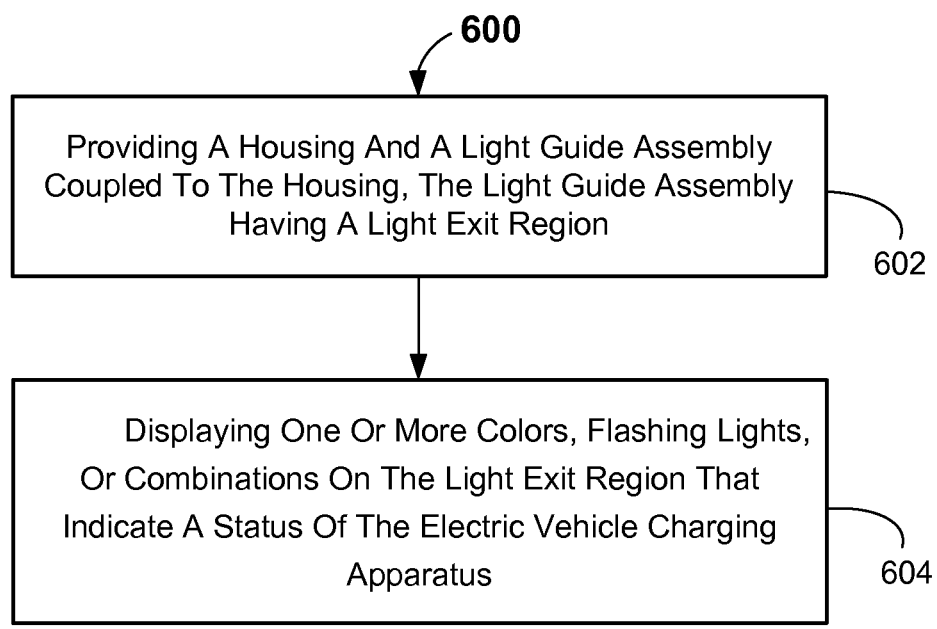
FIG. 6 is a flowchart of a method of operating an electric vehicle charging apparatus according to embodiments.

A method of the invention will now be described with reference to FIG. 6. The method 600 of operating an electric vehicle charging apparatus (e.g., electric vehicle charging apparatus 100) includes, in 602, providing a housing (e.g., 102) and a light guide assembly (e.g., 565) coupled to the housing, the light guide assembly having a light exit region (e.g., 105H), and, in 604, and displaying one or more colors, flashing lights, or combinations on the light exit region that indicate a status of the electric vehicle charging apparatus. For example, multiple colors may be displayed of the light exit regions 105H, such as green and green, red and red, yellow and yellow, or blue and blue. Other colors may be displayed. In other embodiments two different colors may be displayed, such as one on each light exit regions 105H, such as green and yellow, or green and blue, green and red, or green and orange. Other color combinations may be used. Also, one or more of the lights displayed at the light exit regions 105H may be flashing. For example, a flashing green light may be provided on both light exit regions 105H, or a flashing yellow may be provided on both, or a flashing blue may be provided on both, or a flashing red may be provided on both. In another embodiment, flashing green and yellow lights may be provided on both light exit regions 105H, or a flashing green and yellow may be provided on both, or a flashing green and blue may be provided, or a flashing red and yellow may be provided on both. Other combinations of flashing colored lights may be used. The flashing lights may be alternating or in sync, or in a defined pattern, for example. Other combinations of any of the above may be used to signify a status.

It should be readily appreciated by those persons skilled in the art that the present invention is susceptible of broad utility and application. Many embodiments and adaptations of the present invention other than those herein described, as well as many variations, modifications, and equivalent arrangements, will be apparent from, or reasonably suggested by, the present invention and the foregoing description thereof, without departing from the substance or scope of the present invention. Accordingly, while the present invention has been described herein in detail in relation to specific embodiments, it is to be understood that this disclosure is only illustrative and presents examples of the present invention and is made merely for purposes of providing a full and enabling disclosure of the invention. This disclosure is not intended to limit the invention to the particular systems or methods disclosed, but, to the contrary, the intention is to cover all modifications, equivalents, and alternatives falling within the scope of the invention.

What is claimed is:

1. An electric vehicle charging apparatus, comprising:
   a housing having a periphery and a body; and
   a light guide assembly mounted to the body and adapted to display a status of the electric vehicle charging apparatus, the light guide assembly further comprising:
   a light guide including a light receiving region located adjacent to one or more light sources,
   a light guiding region, and
   a light exit region at the periphery, wherein the light exit region includes a side facing surface including an angle of tilt relative to light emitted from the light guiding region, the side facing surface configured to provide a halo effect about one or more segments of the periphery,
   wherein the angle of tilt of the side facing surface is between about 30 and 50 degrees and is selected such that a light beam is spread across substantially all of the side facing surface for providing the halo effect as a maximum halo effect in that the light exit region displays a halo of different colors each color indicating a specific status of a particular electric vehicle charging state.

2. The electric vehicle charging apparatus of claim 1, wherein the light guide receives light from the one or more light sources at the light receiving region located directly adjacent to the one or more light sources, and conveys the light along the light guiding region to the light exit region.

3. The electric vehicle charging apparatus of claim 1, wherein the light exit region includes a forward facing surface and a rear facing surface and the side facing surface.

4. The electric vehicle charging apparatus of claim 1, wherein the angle of the side facing surface is oriented so that the light emitted is spread across substantially all of the side facing surface.

5. The electric vehicle charging apparatus of claim 1, wherein the light guiding region includes a thickness that is substantially constant along a substantial portion of a length thereof.

6. The electric vehicle charging apparatus of claim 1, wherein the light exit region includes a scattering surface treatment.

7. The electric vehicle charging apparatus of claim 1, wherein the light guide assembly comprises a barrier shield including a pocket, and a printed circuit board secured in the pocket.

8. The electric vehicle charging apparatus of claim 7, wherein the one or more light sources are one or more side emitting light sources mounted to the printed circuit board that are operable to outwardly emit light in a direction generally along a plane of the printed circuit board.

9. The electric vehicle charging apparatus of claim 7, wherein the one or more side emitting light sources are mounted along one or more edges of the printed circuit board and emit light through one or more restrictive apertures formed in the barrier shield.

10. The electric vehicle charging apparatus of claim 9, wherein the restrictive apertures in the shield are side slots positioned adjacent to the one or more side emitting light sources, the side slots adapted to limit spread of light emitted from the one or more side emitting light sources.

11. The electric vehicle charging apparatus of claim 1, comprising more than one light exit region located on an exterior of the housing.

12. The electric vehicle charging apparatus of claim 1, wherein the one or more light sources emit one or more colored light emissions into the light guide, wherein the one or more colored light emissions comprise white, green, red, blue, yellow, orange.

13. The electric vehicle charging apparatus of claim 12, wherein the one or more colored light emissions display a status about the electric vehicle charging apparatus.

14. The electric vehicle charging apparatus of claim 13, wherein the status comprises at least one of:
 a readiness to charge,
 a charging state,
 charging,
 a state of charging completeness,
 a fault,
 a fault condition,
 a charge delay,
 a charge delay time,
 a pause,
 an operational mode,
 a communication mode, and
 a remote access condition.

15. An electric vehicle charging apparatus, comprising:
 a housing having a body and a lid including visual indicators, wherein the lid is hinged to the body;
 a light guide assembly mounted to the body, the light guide assembly further comprising:
 a light guide including:
  a light receiving region located adjacent to one or more light sources,
  a light guiding region, and
  a light exit region at the periphery, wherein the light exit region includes a side facing surface including an angle of tilt relative to light emitted from the light guiding region, the side facing surface configured to provide a halo effect about one or more segments of the periphery,
  wherein the angle of tilt of the side facing surface is between about 30 and 50 degrees and selected such that a light beam is spread across substantially all of the side facing surface for providing the halo effect as a maximum halo effect in that the light exit region displays a halo of different colors each color indicating a specific status of a particular electric vehicle charging state;
 a barrier shield mounted under the lid including a plurality of channeling elements;
 a printed circuit board under the barrier shield including one or more switches, and one or more light sources mounted adjacent to the plurality of channeling elements; and
 one or more buttons on the lid coupled to one or more posts, which when depressed make physical contact to toggle the one or more switches and display status information on the visual indicators through the plurality of channeling elements.

16. The electric vehicle charging apparatus of claim 15, comprising a control panel face plate provided on the lid over the buttons.

17. The electric vehicle charging apparatus of claim 15, wherein the visual indicators are lit based upon a detected status of the electric vehicle.

18. The electric vehicle charging apparatus of claim 17, wherein a detected status of the electric vehicle comprises at least one of:
 a power available;
 charging;
 ready;
 a fault;
 a pause; and
 a delay time.

19. An electric vehicle charging apparatus, comprising:
 a housing having a periphery, a body, and a lid, wherein the lid is hinged to the body and includes visual indicators;
 a light guide assembly mounted to the body and adapted to display a status of the electric vehicle charging apparatus, the light guide assembly further comprising:
 a barrier shield mounted under the lid and including a plurality of channeling elements,
 a printed circuit board under the barrier shield and including one or more light sources and one or more switches,
 a light guide including:
  a light receiving region located adjacent to the one or more light sources,
  a light guiding region, and
  a light exit region at the periphery, wherein the light exit region includes a side facing surface including an angle of tilt relative to light emitted from the light guiding region, the side facing surface configured to provide a halo effect about one or more segments of the periphery,
  wherein the angle of tilt of the side facing surface is between about 30 and 50 degrees and is selected such that a light beam is spread across substantially all of the side facing surface for providing the halo effect as a maximum halo effect in that the light exit region displays a halo of different colors each color indicating a specific status of a particular electric vehicle charging state; and
 one or more buttons on the lid coupled to one or more posts, which when depressed make physical contact to toggle the one or more switches and display status information on the visual indicators through the plurality of channeling elements.

* * * * *